(12) United States Patent
Stein et al.

(10) Patent No.: US 10,984,259 B2
(45) Date of Patent: *Apr. 20, 2021

(54) ROAD VERTICAL CONTOUR DETECTION USING A STABILIZED COORDINATE FRAME

(71) Applicant: Mobileye Vision Technologies Ltd., Jerusalem (IL)

(72) Inventors: Gideon Stein, Jerusalem (IL); Itay Blumenthal, Jerusalem (IL); Nadav Shaag, Jerusalem (IL); Yaakov Kingsley, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,360

(22) Filed: Oct. 21, 2019

(65) Prior Publication Data

US 2020/0110945 A1  Apr. 9, 2020

Related U.S. Application Data

(60) Continuation of application No. 16/148,817, filed on Oct. 1, 2018, now Pat. No. 10,452,928, which is a (Continued)

(51) Int. Cl.
*H04N 7/18* (2006.01)
*G06K 9/00* (2006.01)
(Continued)

(52) U.S. Cl.
CPC ....... *G06K 9/00791* (2013.01); *G06K 9/4604* (2013.01); *G06K 9/52* (2013.01);
(Continued)

(58) Field of Classification Search
CPC .... G06K 9/00791; G06K 9/52; G06K 9/4604; G06T 7/74; G06T 5/006; G06T 7/13;
(Continued)

(56) References Cited

U.S. PATENT DOCUMENTS 8,803,694 B2   8/2014  Niem
9,256,791 B2   2/2016  Stein et al.
(Continued)

FOREIGN PATENT DOCUMENTS

CN    102202164 A    9/2011
EP    2602741        6/2013
(Continued)

OTHER PUBLICATIONS

Arvind et al, Vision based driver assistance for near range obstacle sensing under unstructured traffic environment (Year: 2019).*
(Continued)

*Primary Examiner* — Shan E Elahi
(74) *Attorney, Agent, or Firm* — Schwegman Lundberg & Woessner, P.A.

(57) ABSTRACT

In some embodiments, a first homography, created from two images of a roadway, is decomposed to determine an ego-motion, and the ego-motion is used to adjust a previous estimate of a road plane. The adjusted previous estimate of the road plane is combined with the current estimate of the plane to create a second homography, and the second homography is used to determine residual motion and vertical deviation in the surface of the roadway. In some embodiments, multiple road profiles each corresponding to a common portion of a roadway are adjusted in slope and offset by optimizing a function having a data term, a smoothness term and a regularization term; and the adjusted road profiles are combined into a multi-frame road profile. In some embodiments, road profile information for a pre-
(Continued)

determined number of data points is transmitted in periodic data bursts, with more than one data point per data burst.

22 Claims, 18 Drawing Sheets

Related U.S. Application Data division of application No. 15/055,322, filed on Feb. 26, 2016, now Pat. No. 10,115,024.

(60) Provisional application No. 62/120,929, filed on Feb. 26, 2015, provisional application No. 62/131,374, filed on Mar. 11, 2015, provisional application No. 62/149,699, filed on Apr. 20, 2015, provisional application No. 62/238,980, filed on Oct. 8, 2015.

(51) Int. Cl.
| | |
|---|---|
| *G06T 7/73* | (2017.01) |
| *G06T 7/13* | (2017.01) |
| *G06K 9/46* | (2006.01) |
| *G06K 9/52* | (2006.01) |
| *G06T 5/00* | (2006.01) |
| *G06T 7/20* | (2017.01) |
| *G06T 7/40* | (2017.01) |
| *G06T 7/60* | (2017.01) |

(52) U.S. Cl.
CPC ............... *G06T 5/006* (2013.01); *G06T 7/13* (2017.01); *G06T 7/20* (2013.01); *G06T 7/40* (2013.01); *G06T 7/60* (2013.01); *G06T 7/74* (2017.01); *H04N 7/18* (2013.01); *G06T 2207/30252* (2013.01)

(58) Field of Classification Search
CPC .... G06T 7/40; G06T 7/60; G06T 7/20; G06T 2207/30252; H04N 7/18
USPC ......................................................... 348/148
See application file for complete search history.

(56) References Cited

U.S. PATENT DOCUMENTS

| | | | |
|---|---|---|---|
| 9,826,199 B2 | 11/2017 | Stein et al. | |
| 9,852,637 B2 | 12/2017 | Hayee et al. | |
| 10,115,024 B2* | 10/2018 | Stein ..................... | G06K 9/4604 |
| 10,452,928 B2* | 10/2019 | Stein ........................ | G06T 7/40 |
| 2004/0164851 A1 | 8/2004 | Crawshaw | |
| 2006/0206243 A1 | 9/2006 | Pawlicki et al. | |
| 2008/0046150 A1 | 2/2008 | Breed | |
| 2009/0153362 A1 | 6/2009 | Goto et al. | |
| 2010/0017060 A1 | 1/2010 | Zhang et al. | |
| 2010/0079590 A1 | 4/2010 | Kuehnle et al. | |
| 2010/0121577 A1 | 5/2010 | Zhang et al. | |
| 2010/0246901 A1 | 9/2010 | Yang | |
| 2011/0006903 A1 | 1/2011 | Niem | |
| 2011/0093179 A1 | 4/2011 | Schofield et al. | |
| 2014/0067250 A1* | 3/2014 | Bone ...................... | G08G 1/167 |
| | | | 701/301 |
| 2014/0111647 A1 | 4/2014 | Atsmon et al. | |
| 2014/0195112 A1* | 7/2014 | Lu ........................ | B60G 17/0165 |
| | | | 701/37 |
| 2015/0086080 A1 | 3/2015 | Stein et al. | |
| 2015/0210274 A1 | 7/2015 | Clarke et al. | |
| 2015/0210311 A1 | 7/2015 | Maurer et al. | |
| 2015/0317525 A1 | 11/2015 | Stein et al. | |
| 2015/0341620 A1* | 11/2015 | Han .................... | H04N 13/257 |
| | | | 701/37 |
| 2015/0371096 A1 | 12/2015 | Stein et al. | |
| 2016/0001780 A1* | 1/2016 | Lee .................... | G06K 9/00791 |
| | | | 701/48 |
| 2016/0034771 A1 | 2/2016 | Schamp | |
| 2016/0253566 A1 | 9/2016 | Stein et al. | |
| 2016/0295589 A1 | 10/2016 | Nikopour et al. | |
| 2016/0318490 A1 | 11/2016 | Ben | |
| 2017/0270372 A1 | 9/2017 | Stein | |
| 2017/0277716 A1 | 9/2017 | Giurgiu et al. | |
| 2017/0329001 A1 | 11/2017 | Brandt | |
| 2017/0336792 A1 | 11/2017 | Gdalyahu et al. | |
| 2017/0336801 A1 | 11/2017 | Shashua et al. | |
| 2017/0364082 A1 | 12/2017 | Taieb et al. | |
| 2018/0023960 A1 | 1/2018 | Fridman | |
| 2018/0023961 A1 | 1/2018 | Fridman | |
| 2018/0024562 A1 | 1/2018 | Bellaiche | |
| 2018/0024565 A1 | 1/2018 | Fridman | |
| 2018/0024568 A1 | 1/2018 | Fridman | |
| 2018/0025235 A1 | 1/2018 | Fridman | |
| 2019/0034739 A1 | 1/2019 | Stein et al. | |

FOREIGN PATENT DOCUMENTS

| | | |
|---|---|---|
| EP | 3262566 | 1/2018 |
| WO | 2014152470 | 9/2014 |
| WO | WO-2014111814 A3 | 2/2015 |
| WO | 2016135736 | 9/2016 |
| WO | 2016135736 | 10/2016 |

OTHER PUBLICATIONS

Prinet et al, 3D road curb extraction from image sequence for automobile parking assist system (Year: 2016).*
Shinzato et al, Road terrain detection: Avoiding common obstacle detection assumption using sensor fusion (Year: 2014).*
"U.S. Appl. No. 15/055,322, Notice of Allowance dated Jun. 29, 2018", 12 pgs.
"U.S. Appl. No. 15/055,322, Restriction Requirement dated Oct. 3, 2017", 7 pgs.
"U.S. Appl. No. 15/055,322, Examiner Interview Summary dated Dec. 26, 2017", 2 pgs.
"U.S. Appl. No. 15/055,322, Non Final Office Action dated Jan. 8, 2018", 20 pgs.
"U.S. Appl. No. 15/055,322, Examiner Interview Summary dated Apr. 20, 2018", 3 pgs.
"International Application Serial No. PCT IL2016 050224, International Search Report dated Aug. 22, 2016", 6 pgs.
"International Application Serial No. PCT IL2016 050224, Written Opinion dated Aug. 22, 2016", 13 pgs.
"International Application Serial No. PCT IL2016 050224, International Preliminary Report on Patentability dated Sep. 8, 2017", 15 pgs.
"Normal (geometry)—Wikipedia, the free encyclopedia", Retrieved from the Internet:URL:https:jjen.wikipedia.orgjwjindex.php?title= Normal (geometry)andoldid=645324617[retrieved on Jun. 17, 2016] section 1, (Feb. 2, 2015), 6 pgs.
"Camera Calibration and 3D Reconstruction—OpenCV v2.3 documentation", third paragraph,starting "Real lenses usually have some distortion" Original publication date from search report Oct. 23, 2014, Retrieved from the Internet:URLhttps: web.archive.orgjweb 20141023012259 http:jjdocs.opencv.org 2.3 modules calib3d doc camera_calibration and 3d reconstruction.html[retrieved on Jun. 16, 2016], (Accessed on Mar. 22, 2020), 47 pgs.
"U.S. Appl. No. 15/055,322, Response filed Dec. 1, 2017 to Restriction Requirement dated Oct. 3, 2017", 1 pg.
"U.S. Appl. No. 15/055,322, Supplemental Amendment filed Dec. 20, 2017", 8 pgs.
"U.S. Appl. No. 15/055,322, Response filed May 8, 2018 to Non Final Office Action dated Jan. 8, 2018", 14 pgs.
"U.S. Appl. No. 16/148,817, Preliminary Amendment filed Nov. 13, 2018", 8 pgs.
"European Application Serial No. 16717712.0, Amendment filed Apr. 17, 2018", 19 pgs.
"European Application Serial No. 16717712.0, Office Action dated Oct. 4, 2017", 2 pgs.
"U.S. Appl. No. 16/148,817, Notice of Allowance dated Jun. 11, 2019", 10 pgs.

(56) References Cited

OTHER PUBLICATIONS

Liu, "Stochastic predictive control for lane keeping assistance systems using a linear time-varying model", (2015), 6 pgs.
Poggenhans, "A universal approach to detect and classify road surface marking", (2015), 7 pgs.
Uluer, "Driver's authority monitoring system for intelligent vehicles: A feasibility study", (2012).
"European Application Serial No. 16717712.0, Communication Pursuant to Article 94(3) EPC dated Aug. 24, 2020", 5 pgs.
"Chinese Application Serial No. 201680017324.3, Office Action dated Jan. 18, 2021", w/ Concise Statement of Relevance, 7 pgs.

\* cited by examiner

ROAD VERTICAL CONTOUR DETECTION USING A STABILIZED COORDINATE FRAME

CROSS-REFERENCE TO RELATED APPLICATIONS

The present application is a continuation of Ser. No. 16/148,817, filed Oct. 1, 2018, which is a Division of U.S. patent application Ser. No. 15/055,322, filed Feb. 26, 2016, which claims priority from U.S. provisional patent application 62/12/120,929, titled "Road Plane Profile Output in a Stabilized World Coordinate Frame," filed Feb. 26, 2015; U.S. provisional patent application 62/131,374, titled "Road Plane Output in a Stabilized World Coordinate Frame," filed Mar. 11, 2015; U.S. provisional patent application 62/149,699, titled "Road Plane Profile Output in a Stabilized World Coordinate Frame," filed Apr. 20, 2015; and U.S. provisional patent application 62/238,980, titled "Road Plane Output in a Stabilized World Coordinate Frame," filed Oct. 8, 2015; the disclosures of which are included herein by reference.

TECHNICALLY RELATED APPLICATIONS

This application is related to U.S. application Ser. No. 14/554,500 (now U.S. Pat. No. 9,256,791), titled "Road Vertical Contour Detection," filed Nov. 26, 2014; and to U.S. application Ser. No. 14/798,575, titled "Road Contour Vertical Detection, filed Jul. 14, 2015, both of which are hereby incorporated by reference in their entirety.

BACKGROUND

Technical Field

This application relates to driver assistance systems and methods to detect the vertical deviation of a contour of a road using a camera, and more specifically to using a stabilized coordinate frame to detect vertical deviation of a contour of the road.

Description of Related Art

In recent years, camera-based driver assistance systems (DAS) have been entering the market, including lane departure warning (LDW), automatic high-beam control (AHC), traffic sign recognition (TSR), forward collision warning (FCW) and pedestrian detection.

Reference is now made to FIGS. 1 and 2 which illustrate a system 16, including a camera or image sensor 12 mounted in a vehicle 18, according to some embodiments. Image sensor 12, imaging a field of view in the forward direction, provides image frames 15 in real time and image frames 15 are captured by an image processor 30. Processor 30 may be used to process image frames 15 simultaneously and/or in parallel to serve a number of DAS/applications. Processor 30 may be used to process image frames 15 to detect and recognize an image or portions of the image in the forward field of view of camera 12. The DAS may be implemented using specific hardware circuitry (not shown) with on-board software and/or software control algorithms in storage 13. Image sensor 12 may be monochrome or black-white, i.e., without color separation, or image sensor 12 may be color sensitive. By way of example in FIG. 2, image frames 15 are used to serve pedestrian detection 20, TSR 21, FCW 22 and real time detection 23 of the vertical contour of the road or deviation from the road plane according some embodiments.

In some embodiments, more than one camera may be mounted in a vehicle. For example, a system may have multiple cameras pointing in different directions. A system also may have multiple cameras pointing in the same or similar directions with respect to the vehicle, but mounted at different locations. In some embodiments, a system may have multiple cameras that have partially or completely overlapping fields of view. In some embodiments, two side by side cameras may operate in stereo. The non-limiting examples discussed herein contemplate single-camera systems, but they may be similarly implemented in multiple-camera systems, wherein some or all of the relevant images and frames may be captured by different cameras, or may be created from a composite of images captured from multiple cameras.

In some cases, image frames 15 are partitioned between different driver assistance applications and in other cases the image frames 15 may be shared between the different driver assistance applications.

Certain existing methods for detecting the vertical deviation of a contour of a road using a vehicle-mounted camera are known. Certain previously known algorithms can be summarized as follows:

1. A first pair of two consecutive frames captured by a vehicle-mounted camera are aligned using a homography of the road. This gives the ego-motion (rotation R and translation T) between the frames. FIG. 3A shows a grid of 33 points in the image which are tracked and used to compute the homography.
2. A second pair of frames is then selected, the current frame and the nearest previous frame representing a point in time from which the vehicle has currently moved over a minimum threshold distance. A chaining of the first pair of frames (the consecutive frames) is used to create an initial guess of the homography, and a more accurate homography for the second pair of frames is then computed, and the reference plane is determined.
3. The path of the vehicle is then projected onto the image plane (as shown by the lines in FIG. 3C). Strips along each path are used to compute the residual motion, which gives the profile relative to the reference plane determined. FIG. 3B shows a normalized correlation score for a strip 31 pixels wide along the path of the left wheel for vertical motion ±6 pixels. A small curvature can be seen, indicated by the arrow. This curvature represents the small residual motion indicative of a speed bump.
4. Finally, the residual motion is translated into a metric distance and height, and is combined into a multi-frame model. The results are shown in the upper graphs in FIG. 3C.

One previously known algorithm in accordance with the brief description above is described in greater detail in U.S. Pat. No. 9,256,791.

One example of data generated in accordance with previous methods is shown in FIGS. 4A and 4B. FIGS. 4A and 4B show road profiles from a sequence of frames aligned using the recovered rotation (R), translation (T) and plane normal (N). One can see a speed bump near meter 40, but also a strong divergence of signals caused by inaccurate motion and plane normal; the samples show a divergence of about 0.1 meters in height between the profiles.

BRIEF SUMMARY

One drawback of known methods such as the one described above is that a different reference plane is used at each time step. The reference plane used at each time step is related to the true ground plane of the road as calculated based the frame at each respective step. By recalculating this ground plane at every step, there may be slight deviations between the reference ground plane in each step, making it cumbersome to combine information from multiple frames at different time steps. For example, when there are speed bumps in the road, particularly when a speed bump or bump takes up a large portion of one or more frames, then the dominant plane may combine part of the bump and parts of the road, leading to inaccurate calculations of vertical deviations in the road. Furthermore, small deviations in the road plane can cause new measurements to align poorly. In theory, the ego-motion and plane information derived from the homography can align the new measurements; however, noise in the plane normal and ego-motion (particularly translation) do not easily allow for accurate alignment. These issues can be seen in the example results shown in FIGS. 7A and 7B, described in further detail below.

Another drawback of certain previous methods is their failure to account for both lens distortion (e.g., radial distortion) and the effects of rolling shutter. If the effects of lens distortion and rolling shutter are ignored, previously known methods may yield qualitatively correct single results with vertical deviations in the road plane identified, but distances may be inaccurate, ego-motion may be inaccurate and there may be a small upward curvature to the resulting profile.

Accordingly, there is a need for systems and methods that use a consistent ground plane to calculate vertical deviations in the surface of roads. As explained herein, improved methods may create, at each time step, a homography matrix that is based on a consistent ground plane, and may then use this homography to align frames and compute residual motion and road profiles.

The term "homography" as used herein refers to an invertible transformation from a projective space to itself that maps straight lines to straight lines. In the field of computer vision, two images of the same planar surface in space are related by a homography assuming a pinhole camera model. In some embodiments, where a homography is referenced by this disclosure, alternate models of a road surface might also be used in a similar manner; for example, in some embodiment, a road may be modeled with some curvature as a quadratic surface.

In particular, by way of example, for a given camera 12 height (1.25 m), focal length (950 pixels) and vehicle motion between frames (1.58 m), it may be possible to predict the motion of the points on the road plane between the two image frames 15a and 15b, respectively. Using a model of the almost planar surface for the motion of the road points, it is possible to warp the second image 15b towards the first image 15a. The following Matlab™ code would perform initial warp step 501:

```
[h,w]=size(Iin);
Iout=zeros(size(Iin)):
for i=1:h,
        for j=1;w,
            x=j;
            y=i;
            S=dZ/(f*H);
            x1=x(:)-x0;
            y1=y(:)-y0;
            y2=y1./(1+y1*S);
            x2=x1./(1+y1*S)
            x2=x2+x0;
            y2=y2+y0;
            Iout(i,j)bilinearInterpolate(Iin,x2,y2);
        end;
    end;
``` where dZ is the forward motion of vehicle 18. H is camera 12 height and f is the focal length of camera 12. $P_0=(x_0; y_0)$ is the vanishing point of the road structure. Alternatively, it may be possible to use initial calibration values during installation of system 16 in vehicle 18, where $x_0$ is the forward direction of the vehicle 18 and $y_0$ is the horizon line when vehicle 18 is on a horizontal surface. The variable S is an overall scale factor relating image coordinates between the two image frames 15a and 15b captured at different vehicle distances Z from camera 12. The term "relative scale change" as used herein refers to the overall scale change in image coordinates dependent upon distance Z to camera 12.

Furthermore, there is a need for systems and methods that account for the effects of radial distortion and rolling shutter in order to accurately detect distances, accurately measure ego-motion, and accurately generate road profiles without artificial upward curvature. In some embodiments, such systems and methods may account for radial distortion and rolling shutter, but may use original images (without adjustments for rolling shutter and radial distortion) for points tracking, in order to avoid computationally expensive pre-warping of images.

Various driver assistance systems mountable in a host vehicle and computerized methods are provided for herein for detecting a vertical deviation of a road surface. The methods are performable by a DAS mountable in a host vehicle while the host vehicle is moving. The DAS may include a camera operatively connectible to a processor.

In some embodiments, a computerized road surface deviation detection method is performed by a driver assistance system mounted in a vehicle, wherein the driver assistance system comprises a camera operatively connectible to a processor. In some embodiments, the method comprises capturing multiple images via the camera, the multiple images comprising a first image of the road surface captured at a first time and a second image of the road surface captured at a second time, the second time being subsequent to the first time, determining, based on at least the first image and the second image, a first estimate of a plane normal of the road and a second estimate of the plane normal of the road, creating a model of the road surface based on at least the first estimate of the plane normal and the second estimate of the plane normal, using the model of the road surface to determine a residual motion along a projected path of the vehicle, computing a vertical deviation of the road surface based on the residual motion, and transmitting vertical deviation data to a vehicle control system.

In some embodiments, a driver assistance system is mounted in a vehicle, the system comprising a processor, a camera operatively connectible to the processor, and a memory storing instructions that, when executed by the processor, cause the system to capture multiple images via the camera, the multiple images comprising a first image of the road surface captured at a first time and a second image of the road surface captured at a second time, the second time being subsequent to the first time, determine, based on at least the first image and the second image, a first estimate of a plane normal of the road and a second estimate of the plane normal of the road, create a model of the road surface based on at least the first estimate of the plane normal and the second estimate of the plane normal, use the model of the road surface to determine a residual motion along a projected path of the vehicle, compute a vertical deviation of the road surface based on the residual motion, and transmit vertical deviation data to a vehicle control system.

In some embodiments, a computer readable storage medium stores instructions that, when executed by a processor operatively coupled to a driver assistance system mounted in a host vehicle, cause the system to capture multiple images via a camera operatively connectible to the processor, the multiple images comprising a first image of the road surface captured at a first time and a second image of the road surface captured at a second time, the second time being subsequent to the first time, determine, based on at least the first image and the second image, a first estimate of a plane normal of the road and a second estimate of the plane normal of the road, create a model of the road surface based on at least the first estimate of the plane normal and the second estimate of the plane normal, use the model of the road surface to determine a residual motion along a projected path of the vehicle, compute a vertical deviation of the road surface based on the residual motion, and transmit vertical deviation data to a vehicle control system. In some embodiments, the computer readable storage medium is transitory. In some embodiments, the computer readable storage medium is non-transitory.

In some embodiments, a computerized road surface deviation detection method is performed by a driver assistance system mounted in a vehicle, wherein the driver assistance system comprises a camera operatively connectible to a processor. In some embodiments, the method comprises selecting at least two road profiles, wherein each of the at least two road profiles comprises a common portion of a road, optimizing a function comprising a data term, a smoothness term, and a regularization term to align a first profile from the at least two profiles, and combining the at least two road profiles into a multi-frame profile.

In some embodiments, a driver assistance system mounted in a vehicle comprises a processor, a camera operatively connectible to the processor, and a memory storing instructions that, when executed by the processor, cause the system to select at least two road profiles, wherein each of the at least two road profiles comprises a common portion of a road, optimize a function comprising a data term, a smoothness term, and a regularization term to align a first profile from the at least two profiles, and combine the at least two road profiles into a multi-frame profile.

In some embodiments, a computer readable storage medium storing instructions that, when executed by a processor operatively coupled to a driver assistance system mounted in a host vehicle, cause the system to select at least two road profiles, wherein each of the at least two road profiles comprises a common portion of a road, optimize a function comprising a data term, a smoothness term, and a regularization term to align a first profile from the at least two profiles, and combine the at least two road profiles into a multi-frame profile. In some embodiments, the computer readable storage medium is transitory. In some embodiments, the computer readable storage medium is non-transitory.

In some embodiments, a method of transmitting road profile information in a driver-assistance system mounted in a vehicle, wherein the driver assistance system comprises a camera operatively connectible to a processor and a data interface, is performed. In some embodiments, the method comprises selecting a first distance in front of a wheel of the vehicle, sampling a predetermined number of data points from a road profile alone a projected path of the vehicle, wherein the road profile is based at least in part on images captured by the camera, and wherein the data points are sampled along a segment of the path with an endpoint corresponding to the selected first distance, and wherein one or more of the data points is generated in accordance with a stabilized reference plane, and transmitting road profile information corresponding to the predetermined number of data points in a predetermined number of data transmissions, via the data interface, wherein the number of data transmissions is fewer than the number of data points.

In some embodiments, a driver assistance system is mounted in a vehicle, the system comprising a processor, a camera operatively connectible to the processor, and a memory storing instructions that, when executed by the processor, cause the system to select a first distance in front of a wheel of the vehicle, sample a predetermined number of data points from a road profile along a projected path of the vehicle, wherein the road profile is based at least in part on images captured by the camera, and wherein the data points are sampled along a segment of the path with an endpoint corresponding to the selected first distance, and wherein one or more of the data points is generated in accordance with a stabilized reference plane, and transmit road profile information corresponding to the predetermined number of data points in a predetermined number of data transmissions, via the data interface, wherein the number of data transmissions is fewer than the number of data points.

In some embodiments, a computer readable storage medium stores instructions that, when executed by a processor operatively coupled to a driver assistance system mounted in a host vehicle, cause the system to select a first distance in front of a wheel of the vehicle, sample a predetermined number of data points from a road profile along a projected path of the vehicle, wherein the road profile is based at least in part on images captured by a camera operatively connectible to the processor, and wherein the data points are sampled along a segment of the path with an endpoint corresponding to the selected first distance, and wherein one or more of the data points is generated in accordance with a stabilized reference plane, and transmit road profile information corresponding to the predetermined number of data points in a predetermined number of data transmissions, via the data interface, wherein the number of data transmissions is fewer than the number of data points. In some embodiments, the computer readable storage medium is transitory. In some embodiments, the computer readable storage medium is non-transitory.

In some embodiments, a computerized road surface deviation detection method is performed by a driver assistance system mounted in a vehicle, wherein the driver assistance system comprises a camera operatively connectible to a processor. In some embodiments, the method comprises capturing, via the camera, multiple images depicting a portion of a roadway, determining whether a characteristic of the images is attributable to a shadow cast by a tree branch, in accordance with the determination that a characteristic of the image is not attributable to a shadow cast by a tree branch, processing the characteristic to determine vertical deviations in the portion of the roadway, and in accordance with the determination that a characteristic of the image is attributable to a shadow cast by a tree branch, decreasing consideration of the characteristic in determining vertical deviations in the portion of the roadway.

In some embodiments, a driver assistance system is mounted in a vehicle, the system comprising a processor, a camera operatively connectible to the processor, and a memory storing instructions that, when executed by the processor, cause the system to capture, via the camera, multiple images depicting a portion of a roadway, determine whether a characteristic of the images is attributable to a shadow cast by a tree branch, in accordance with the determination that a characteristic of the image is not attributable to a shadow cast by a tree branch, process the characteristic to determine vertical deviations in the portion of the roadway, and, in accordance with the determination that a characteristic of the image is attributable to a shadow cast by a tree branch, decrease consideration of the characteristic in determining vertical deviations in the portion of the roadway. In some embodiments, the computer readable storage medium is transitory. In some embodiments, the computer readable storage medium is non-transitory.

In some embodiments, a computer readable storage medium stores instructions that, when executed by a processor operatively coupled to a driver assistance system mounted in a host vehicle, cause the system to capture, via a camera operatively connectible to the processor, multiple images depicting a portion of a roadway, determine whether a characteristic of the images is attributable to a shadow cast by a tree branch, in accordance with the determination that a characteristic of the image is not attributable to a shadow cast by a tree branch, process the characteristic to determine vertical deviations in the portion of the roadway, and, in accordance with the determination that a characteristic of the image is attributable to a shadow cast by a tree branch, decrease consideration of the characteristic in determining vertical deviations in the portion of the roadway.

In some embodiments, a computerized road surface deviation detection method is performed by a driver assistance system mounted in a vehicle, wherein the driver assistance system comprises a single camera operatively connectible to a processor. In some embodiments, the method comprises capturing, via the camera, multiple images depicting a portion of a roadway, generating a road profile based at least in part on one or more of the multiple images of the roadway, associating a confidence value with a point in the road profile, and transmitting, to a vehicle control system, data corresponding to the point in the road profile and to the confidence value associated with the point in the road profile.

In some embodiments, a driver assistance system is mounted in a vehicle, the system comprising a processor, a single camera operatively connectible to the processor, and a memory storing instructions that, when executed by the processor, cause the system to capture, via the camera, multiple images depicting a portion of a roadway, generate a road profile based at least in part on one or more of the multiple images of the roadway, associate a confidence value with a point in the road profile, and transmit, to a vehicle control system, data corresponding to the point in the road profile and to the confidence value associated with the point in the road profile.

In some embodiments, a computer readable storage medium stores instructions that, when executed by a processor operatively coupled to a driver assistance system mounted in a host vehicle, cause the system to capture, via a single camera operatively connectible to the processor, multiple images depicting a portion of a roadway, generate a road profile based at least in part on one or more of the multiple images of the roadway, associate a confidence value with a point in the road profile, and transmit, to a vehicle control system, data corresponding to the point in the road profile and to the confidence value associated with the point in the road profile. In some embodiments, the computer readable storage medium is transitory. In some embodiments, the computer readable storage medium is non-transitory.

In some embodiments, a computerized road surface deviation detection method is performed by a driver assistance system mounted in a vehicle, wherein the driver assistance system comprises a camera, having rolling-shutter and radial distortion, operatively connectible to a processor. In some embodiments, the method comprises capturing, via the camera, multiple images depicting a portion of a roadway, compensating for the effects of rolling shutter and radial distortion, generating, based on at least the multiple images depicting the portion of the roadway, a profile of the portion of the roadway, transmitting information regarding the profile of the portion of the roadway to a vehicle control system.

In some embodiments, a driver assistance system is mounted in a vehicle, the system comprising a processor, a camera having rolling-shutter and radial distortion, the camera operatively connectible to the processor, and a memory storing instructions that, when executed by the processor, cause the system to capture, via the camera, multiple images depicting a portion of a roadway, compensate for the effects of rolling shutter and radial distortion, generate, based on at least the multiple images depicting the portion of the roadway, a profile of the portion of the roadway, transmit information regarding the profile of the portion of the roadway to a vehicle control system.

In some embodiments, a non-transitory computer readable storage medium stores instructions that, when executed by a processor operatively coupled to a driver assistance system mounted in a host vehicle, cause the system to capture, via a camera operatively connectible to the processor, multiple images depicting a portion of a roadway, the camera having rolling-shutter and radial distortion, compensate for the effects of rolling shutter and radial distortion, generate, based on at least the multiple images depicting the portion of the roadway, a profile of the portion of the roadway, transmit information regarding the profile of the portion of the roadway to a vehicle control system.

The foregoing and/or other aspects will become apparent from the following detailed description when considered in conjunction with the accompanying figures.

BRIEF DESCRIPTION OF THE DRAWINGS

The following disclosure is made with reference to the accompanying drawings, wherein.

DETAILED DESCRIPTION

Figure 1:
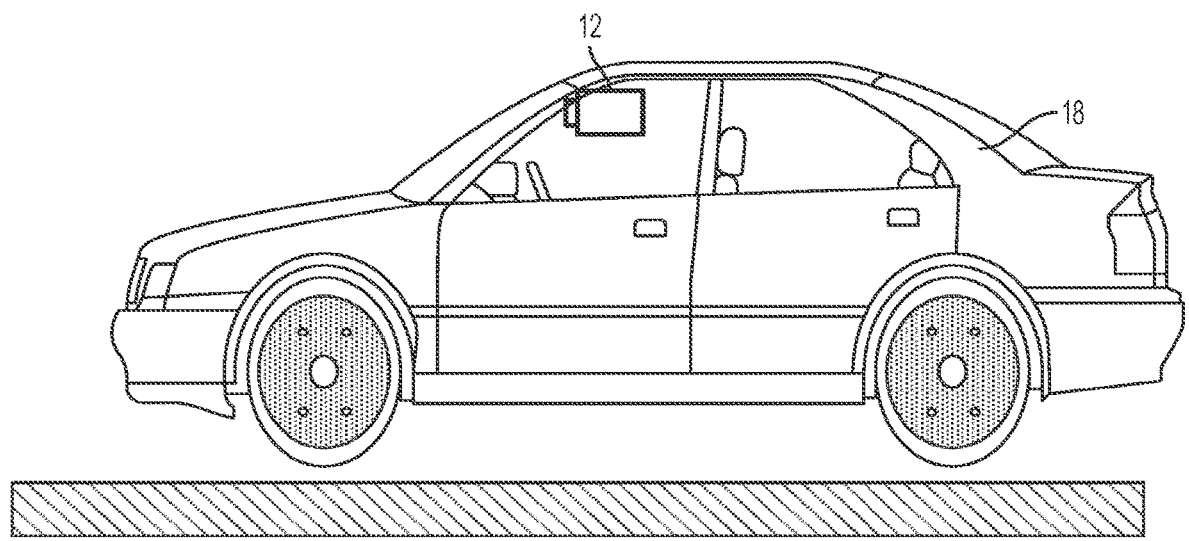
FIGS. 1 and 2 illustrate a system including a camera or image sensor mounted in a vehicle in accordance with some embodiments.

Reference will now be made in detail to features of the present disclosure, examples of which are illustrated in the accompanying drawings, wherein like reference numerals refer to the like elements throughout. The features are described below to explain the techniques disclosed herein by referring to the figures.

Before explaining features of the techniques in detail, it is to be understood that the techniques taught herein are not limited in their application to the details of design and the arrangement of the components set forth in the following description or illustrated in the drawings. The techniques taught herein are capable of incorporating other features or of being practiced or carried out in various ways. Also, it is to be understood that the phraseology and terminology employed herein is for the purpose of description and should not be regarded as limiting.

In this document, lower case coordinates (x,y) are used to denote image coordinates; and upper case coordinates (X,Y, Z) are used to denote world coordinates using a right-handed coordinate system in which X is forward, Y is to the left and Z is upwards with respect to a vehicle-mounted camera.

By way of introduction, various embodiments of the techniques described herein are useful to accurately detect road shape, such as a vertical profile of a road, using camera 12 mounted in host vehicle 18, as described above with reference to FIG. 1. Using systems and methods provided herein, bumps and/or holes such as speed bumps, curbs and manhole covers may be accurately detected with vertical deviations as little as one centimeter from the road plane. System and methods as disclosed herein may be similarly applied to forward viewing, side viewing and rear viewing cameras 12. Various methods as described herein may accurately estimate the planar (or bi-quadratic) model of the road surface and then compute the small deviations from the planar (or bi-quadratic) model to detect bumps and holes.

Radial Distortion and Rolling Shutter Correction

Figure 2:
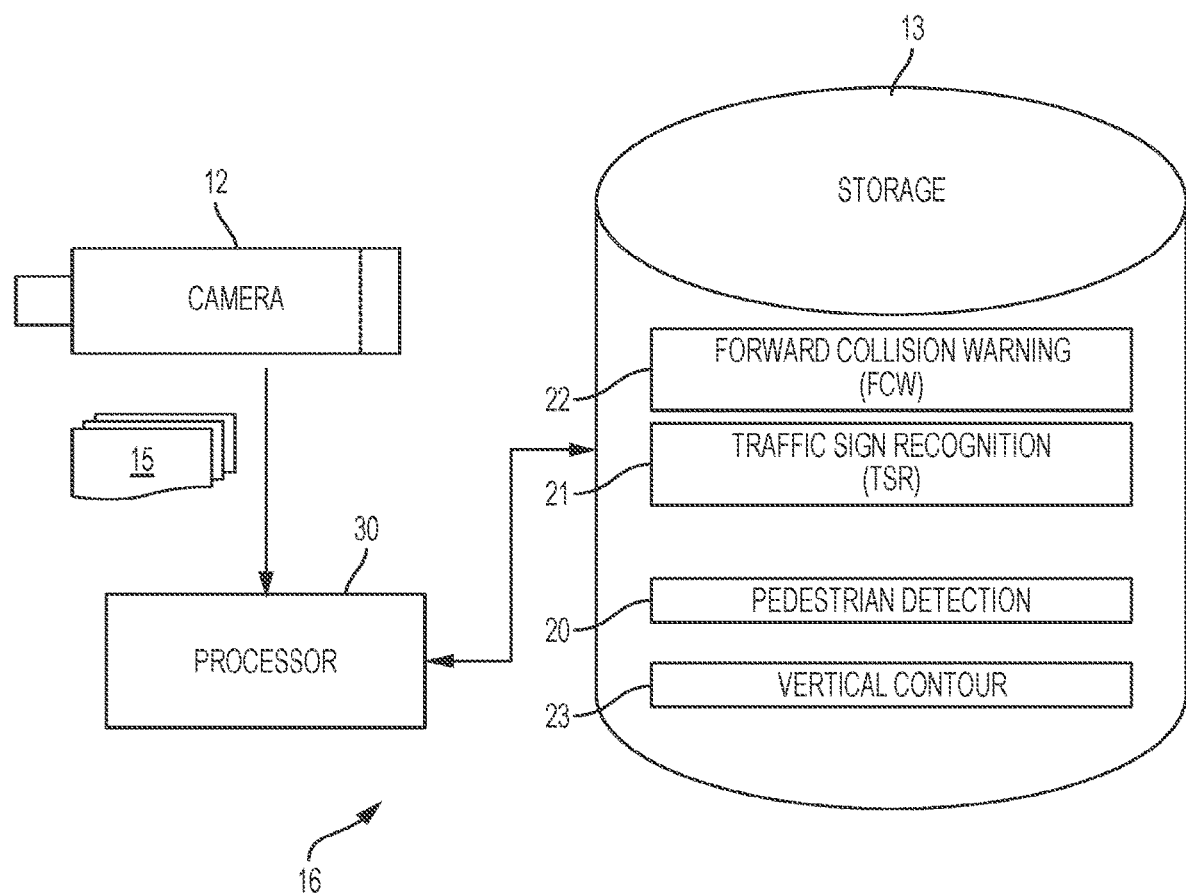
Figure 5:
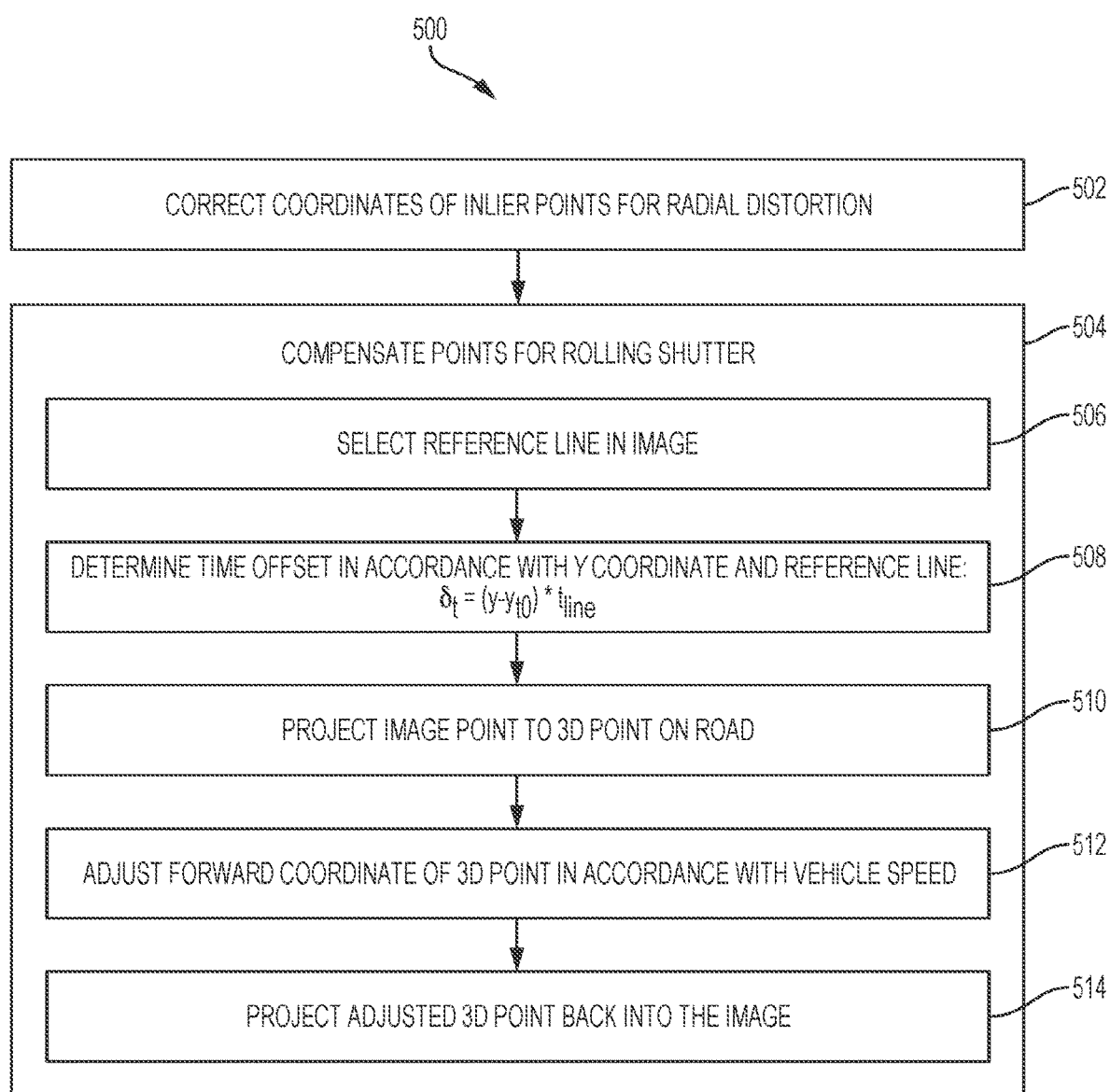
FIG. 5 shows a flow diagram illustrating a method of correcting radial distortion and rolling shutter in accordance with some embodiments.
Figure 6A:
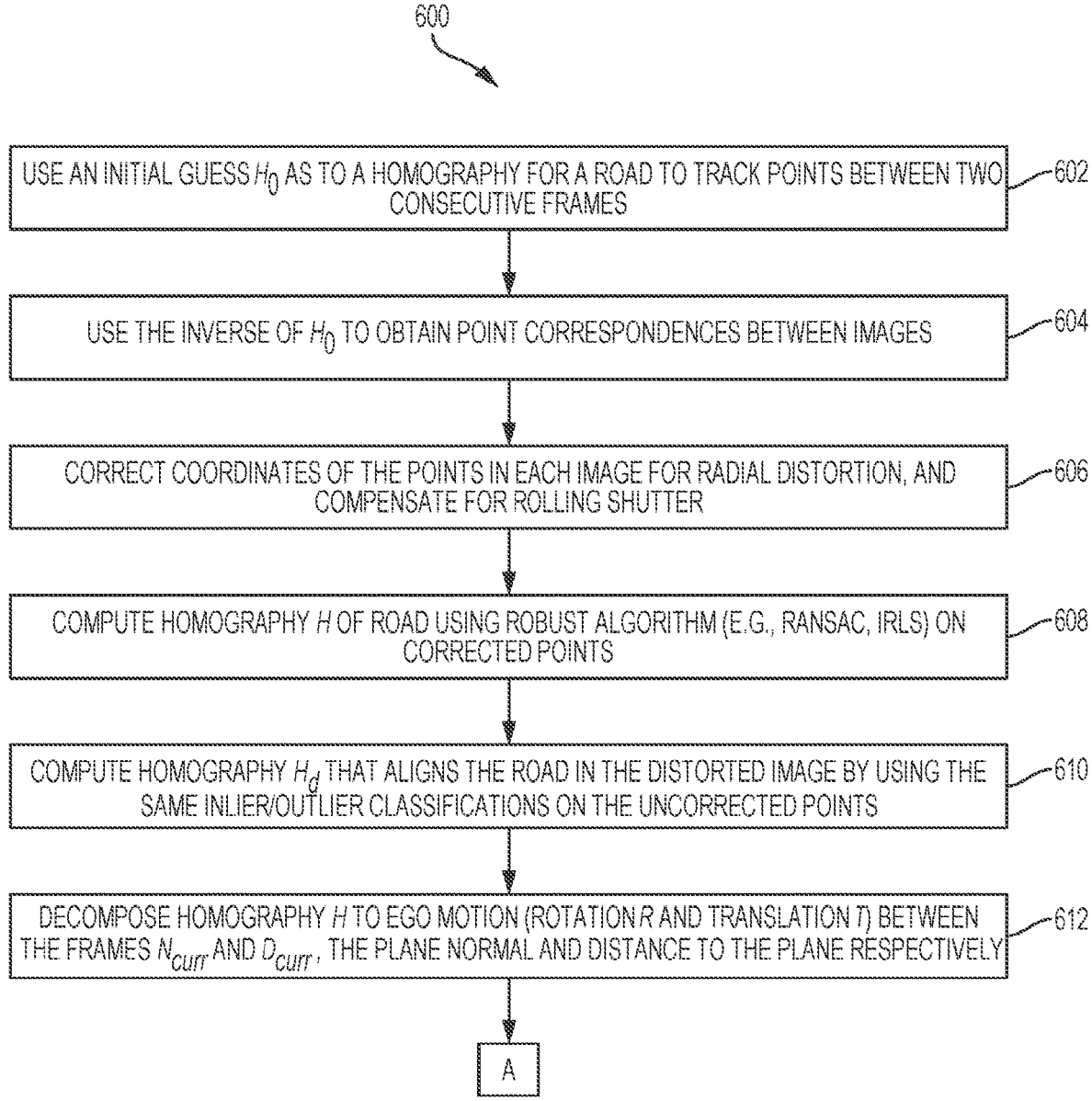
FIGS. 6A-6D show a flow diagram illustrating a method of detecting deviations in a road surface in accordance with some embodiments.
Figure 6B:
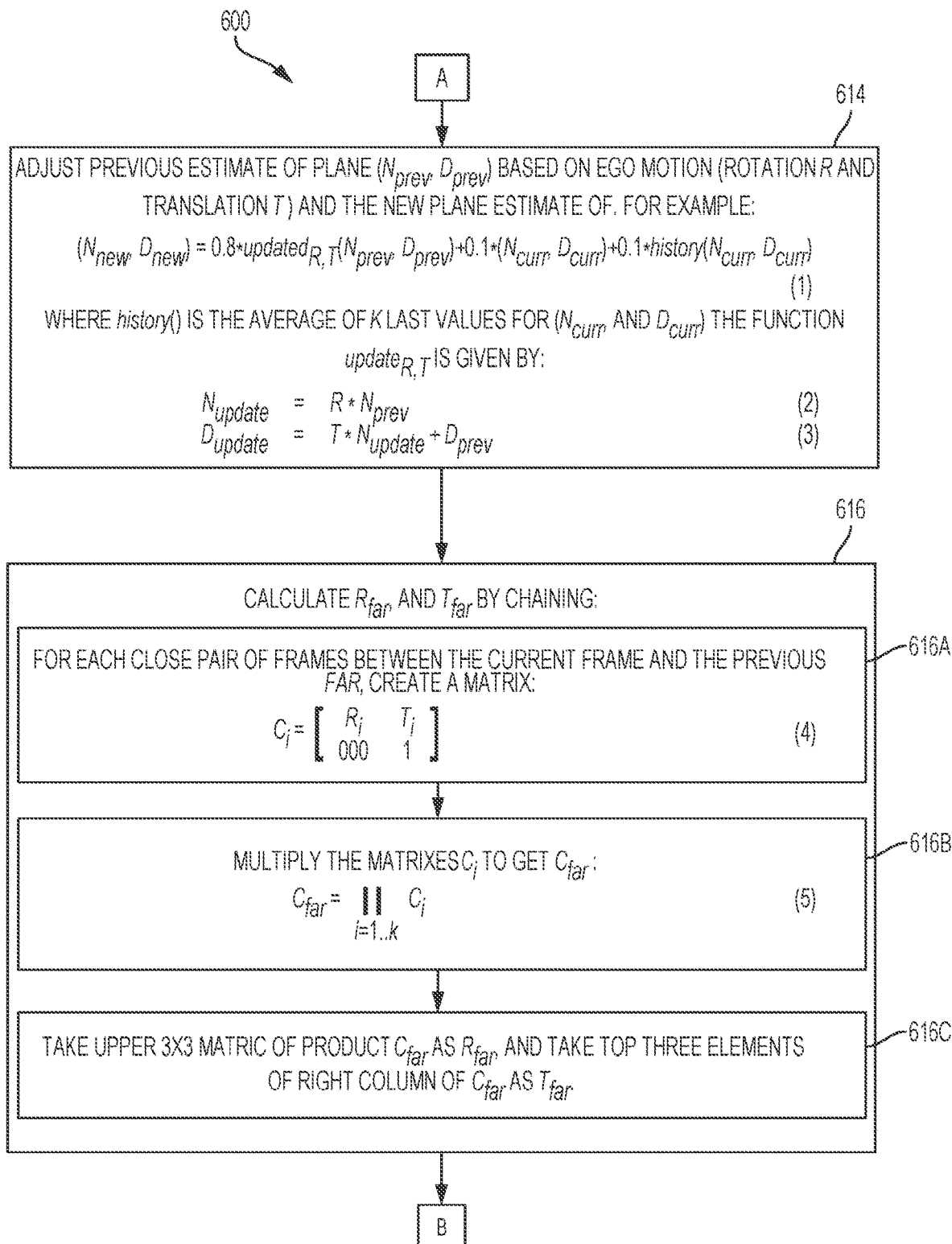
Figure 6C:
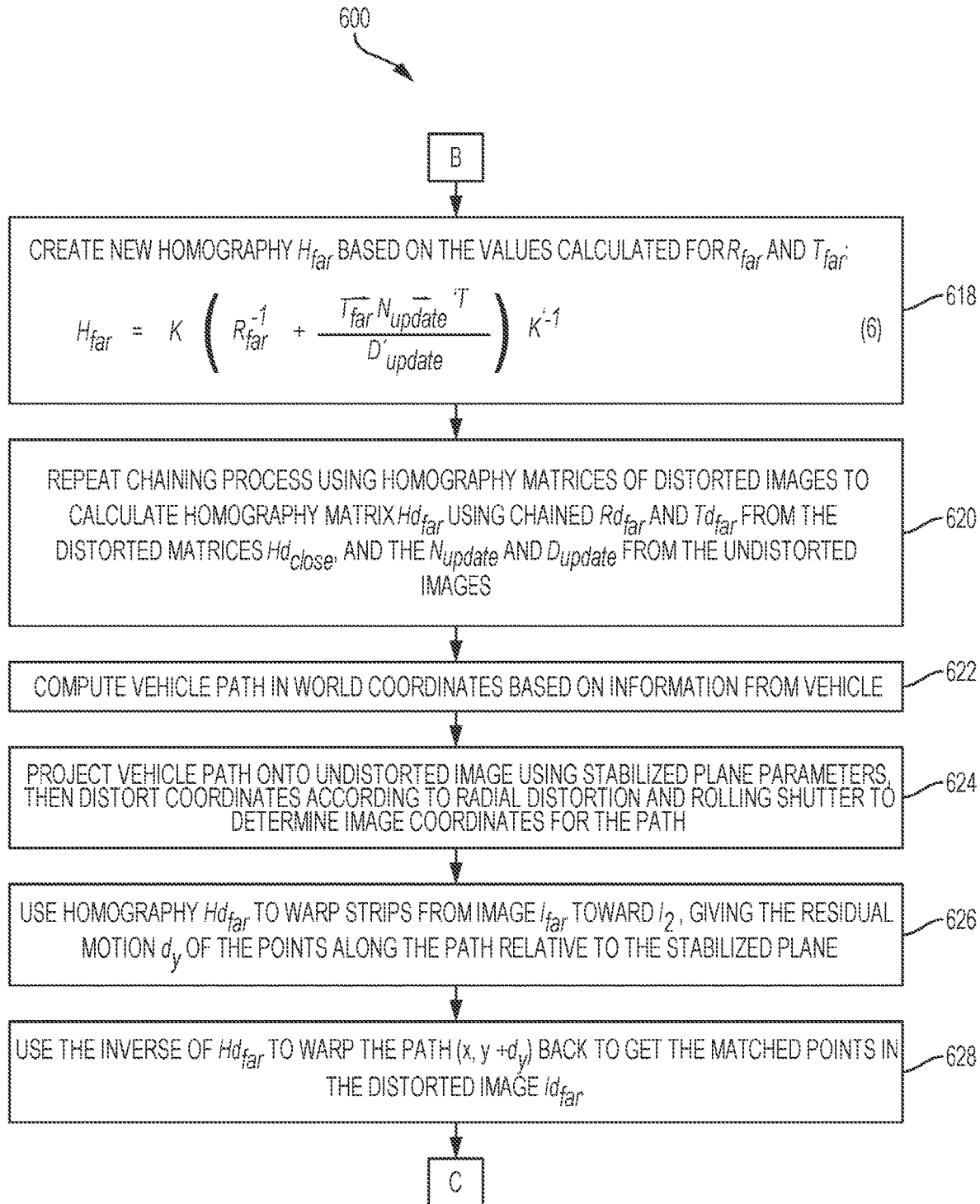
Figure 6D:
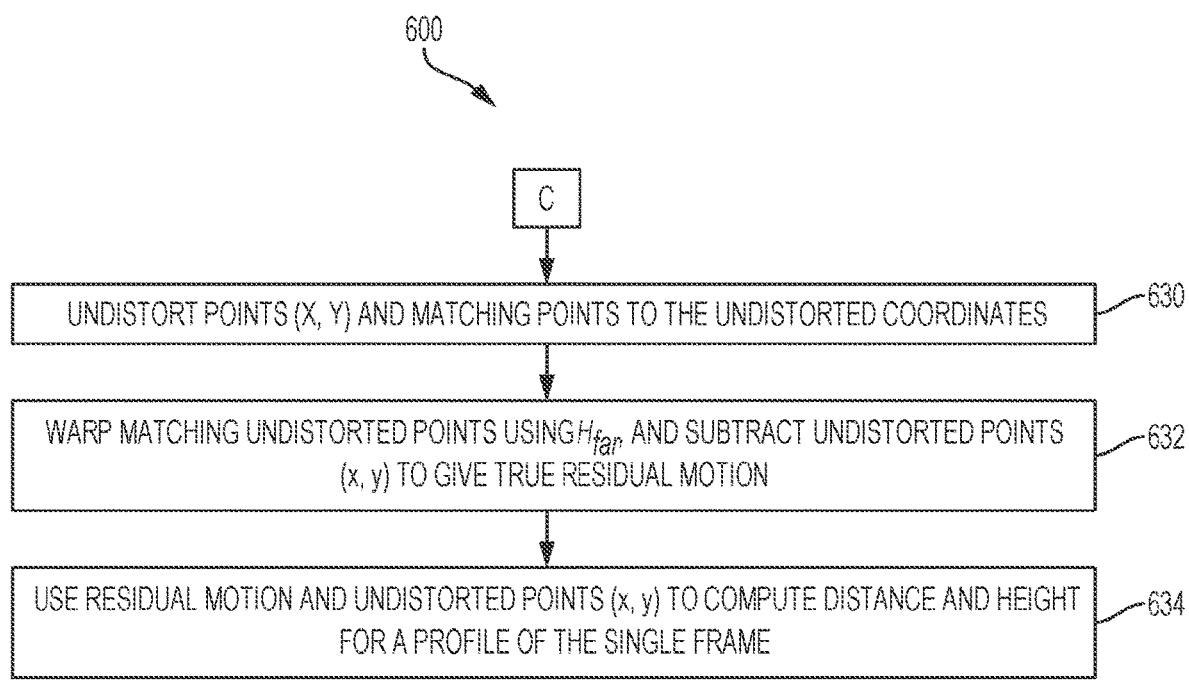

Reference is now made to FIG. 5, which shows a flow diagram of a method 500 of correcting radial distortion and rolling shutter in images of a road such as image frames 15 described above with reference to FIG. 2. In some embodiments, correcting for both radial distortion and rolling shutter may be advantageous in order to accurately detect distances, accurately measure ego-motion and accurately generate road profiles without artificial upward curvature.

In some embodiments, at step 502, the coordinates of inlier points in each captured image may first be corrected for radial distortion using standard models and default lens parameters.

Following the correction of coordinates of inlier points in some embodiments, at step 504, points in each image may be compensated for rolling shutter according to the following steps. First, at step 506, a reference line $y_{r0}$ is selected in the image as $t_0$. Then, at step 508, the image y coordinate gives the time offset for the reference line in accordance with the following:

$$\delta_t = (y - y_{r0}) * t_{line}$$

Next, at step 510, assuming a default road model ([0,0,1] is good for normal vehicle speed and calibrated camera height), a point is projected to a 3D point on the road. Then, at step 512, the X (forward) coordinate is adjusted by $v*\delta_t$, where v is the vehicle speed. Finally, at step 514, the 3D point is projected back into the image.

Single Frame Profile Generation in a Stabilized Coordinate Frame

Reference is now made to FIG. 6, which is flow diagram of method 600, which may create, at each time step, a homography matrix that is based on a consistent ground plane, and may then use this homography to align frames and compute residual motion and road profiles. In some embodiments, techniques in accordance with method 600 may be superior to previously known techniques, because method 600 may allow for multiple frames to be analyzed with respect to the same reference frame, rather than for each frame to be analyzed with respect to a unique reference frame calculated solely in accordance with that respective frame itself. As explained in further detail below, in some embodiments, method 600 enables a stabilized world coordinate frame to be calculated based at least on the combination of (a) a reference plane calculated in accordance with the current frame, (b) a reference plane calculated in accordance with one or more previous frames and (c) an assumed default reference plane based at least in part on the fixed position of the camera relative to the vehicle. The combination of those factors may, in some embodiments, yield a stabilized world coordinate frame that may be used to compare frames corresponding to different steps in time in order to calculate residual motion and recognize vertical deviations in the surface of the roadway. In some embodiments, generating a profile in stabilized road world coordinate frames may be more desirable or advantageous to a receiving system, such as an OEM vehicle control system that controls vehicle suspension; by generating a profile in a stabilized coordinate frame, the information may be more readily applied by the control system, rather than needing to be transformed to road coordinated by the control system after the fact.

It should be noted that, in some embodiments, rather than a homography, another kind of model of the road surface may be used in a similar manner. For example, in some embodiments, a road surface may be modeled with some curvature as a quadratic surface. For the sake of brevity, in the description of exemplary method 600 herein, this disclosure will refer to the use of homographies.

As explained in further detail below, one aspect of method 600 may provide for the creation of a homography for use in warping one image toward another image in order to calculate, residual motion and detect vertical deviations in the road surface. The creation of the homography used in this warping process, in some embodiments, may comprise the combination of information pertaining to a previous estimate of a plane normal, a current estimate of the plane normal, and the average estimates of normal and distance based on a historical period of time over which the car has been driving (e.g., the previous 20 seconds). In some embodiments, a reconstructed homography as explained below may be understood to be based not solely on information gleaned from the images that the system uses in its determination of whether there are any vertical deviations in the road surface, but also on predetermined presumptions about the road plane and/or on historical calculations about the road plane. In some embodiments, such a homography may be calculated and used to analyze frames to detect vertical deviations in a road surface in accordance with the following steps.

Figure 3A:
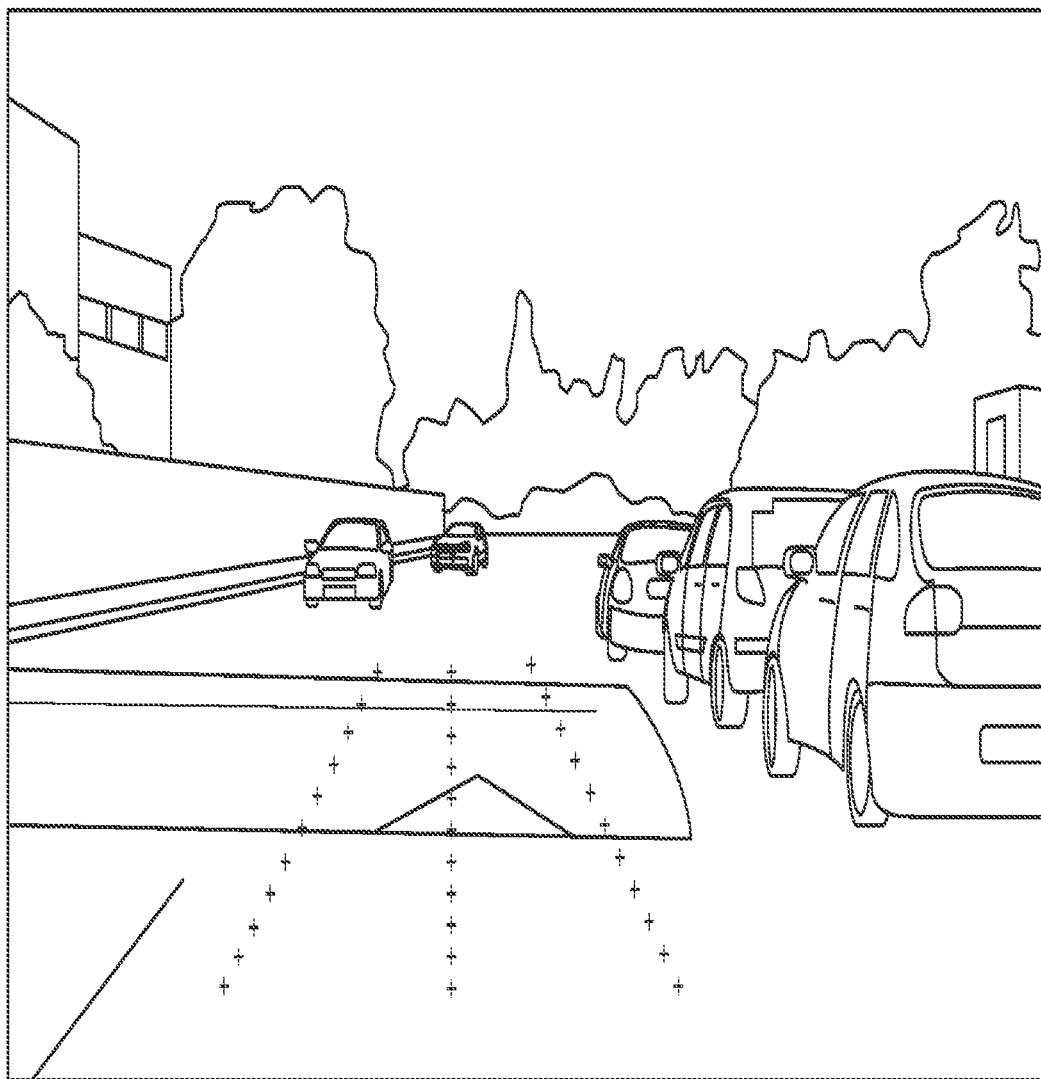
FIG. 3A illustrates points overlaid on a view of a road, wherein the points may be tracked to compute a homography in accordance with some embodiments.

At step 602, in some embodiments, an initial guess $H_0$ as to the homography of the road is used to track points between two consecutive frames. Notwithstanding the methods explained above with respect to FIG. 3, this initial step 602 can in some embodiments be carried out without correcting for radial distortion and rolling shutter. These are point correspondences between a pre-warped image $I1_w$ and image $I2$.

In some embodiments, points may be placed evenly in each image, which gives more points closer to the vehicle; or the points may be spaced evenly in distance, which requires more points concentrated higher in the image (further from the vehicle). In some embodiments, points may be vertically spaced evenly in the image, but greater weight may be given to the more distant points in the least squares computation of the homography. For example, in performing a least squares (e.g., solving Ax=b) each row of A may be weighted equally, or more weight may be given to certain rows (e.g. solve wAx=wb, where w is a diagonal matrix of weights).

At step 604, in some embodiments, the inverse of $H_0$ is used to obtain the point correspondences between images $I1$ and $I2$.

Figure 4A:
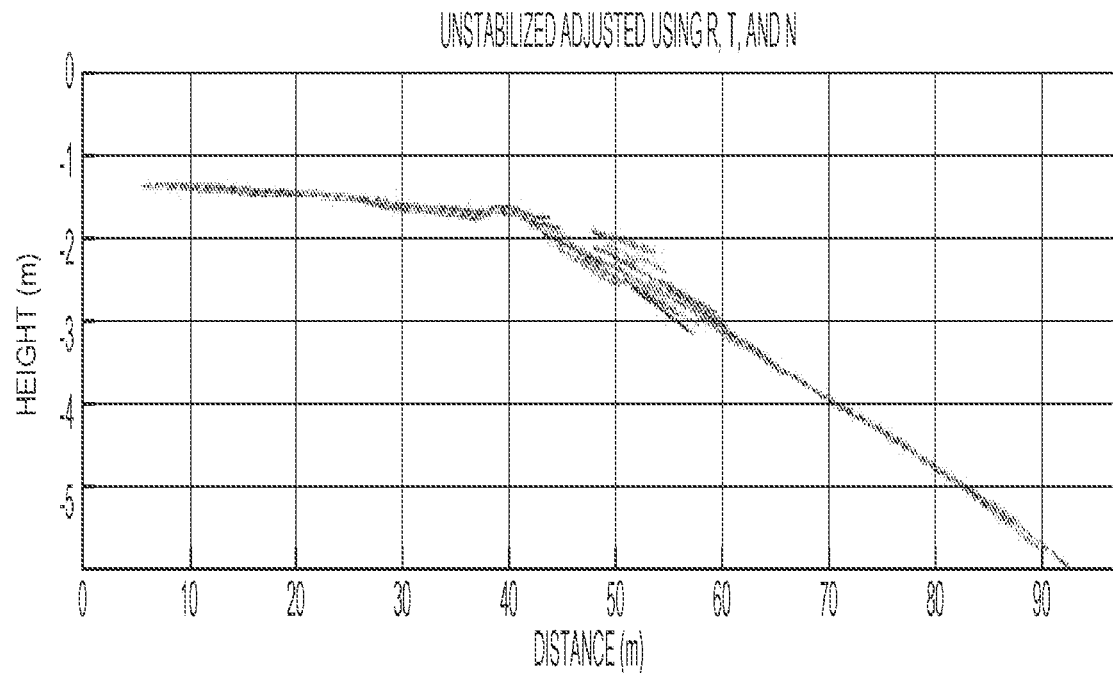
FIGS. 4A-4B illustrate unstabilized road profiles in accordance with some embodiments.
Figure 4B:
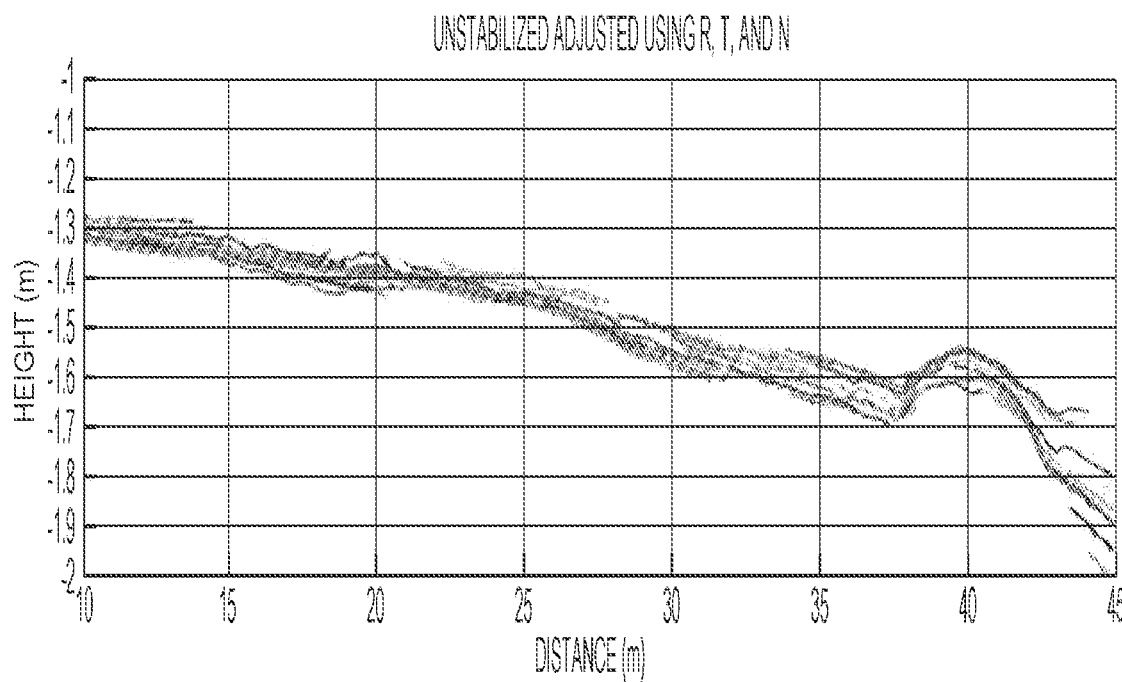

At step 606, in some embodiments, the coordinates of the points in each image are corrected for radial distortion and compensated for rolling shutter. In some embodiments, these corrections and compensations may be carried out in accordance with the techniques explained above with respect to FIG. 4.

At step 608, in some embodiments, a homography of the road, H, is found using RANdom SAmple Consensus (RANSAC) on the corrected points. RANSAC is an example of a robust algorithm which rejects outliers. Iteratively reweighted least squares (IRLS) and other robust algorithms may also be used.

At step 610, in some embodiments, the same inlier/outlier classification may be used on the uncorrected points to compute a homography $H_d$ which aligns the road in the distorted image.

At step 612, in some embodiments, the homography H may be decomposed to the ego-motion (rotation R and translation T) between the frames and $N_{curr}$ and $D_{curr}$, the plane normal and distance to the plane, respectively. Note that R and T represent the vehicle motion and so are unique, while the plane N and D are somewhat arbitrary and so will have significantly more noise.

At step 614, in some embodiments, the previous estimate of the plane ($N_{prev}$, $D_{prev}$) is adjusted based on the ego-motion (rotation R and translation T) and the new plane estimate of $N_{curr}$ and $D_{curr}$. Adjusted values $N_{new}$ and $D_{new}$ may be calculated in accordance with the following equation.

$$(N_{new}, D_{new}) = 0.8 * \text{updated}_{R,T}(N_{prev}, D_{prev}) + 0.1 * (N_{curr}, D_{curr}) + 0.1 * \text{history}(N_{curr}, D_{curr}) \quad (1)$$

where the function history( ) is the average of K last values for ($N_{curr}$ and $D_{curr}$) the function $\text{update}_{R,T}$ is given by:

$$N_{update} = R * N_{prev} \quad (2)$$

$$D_{update} = T * N_{update} + D_{prev} \quad (3)$$

Note that the values 0.8, 0.1, and 0.1 in equation (1) are merely exemplary, and any other set of three values summing to 1.0 could be used.

At step 616, in some embodiments, $R_{far}$ and $T_{far}$ are calculated by chaining in accordance with the following sub-steps. First, for each close pair of frames between the current frame and the previous far, matrices may be created in accordance with the following:

$$C_i = \begin{bmatrix} R_i & T_i \\ 000 & 1 \end{bmatrix} \quad (4)$$

Next, the matrices $C_i$ are multiplied to get $C_{far}$:

$$C_{far} = \prod_{i=1...k} C_i \quad (5)$$

Then finally, the upper 3×3 matrix of the product $C_{far}$ is taken as $R_{far}$, and the top three elements of the right column are taken as $T_{far}$.

At step 618, in some embodiments, a new homography $H_{far}$ is then created based on the values calculated for $R_{far}$ and $T_{far}$.

$$H_{far} = K \left( R_{far}^{-1} + \frac{T_{far}^- N_{update}^{-'T}}{D'_{update}} \right) K' - 1 \quad (6)$$

where T indicates a transpose, and where apostrophes indicate the second image (e.g., 'T is in the coordinate frame of the second image).

At step 620, in some embodiments, the chaining process may be repeated using the pornography matrices of the distorted images. A homography matrix $Hd_{far}$ may be constructed using the chained $Rd_{far}$ and $Td_{far}$ (for example, in accordance with a similar equation as shown above with respect to step 418) from the distorted matrices $Hd_{close}$, and the $N_{update}$ and $D_{update}$ from the undistorted images.

At step 622, in some embodiments, the vehicle path is computed in world coordinates (e.g., X,Y,Z) based on information from the vehicle, such as information indicating the vehicle's speed, velocity, direction, acceleration, etc; this information may be known from sources other than a camera-based navigation system, such as other sensors with which the vehicle is equipped that may determine its speed velocity, direction, acceleration and other state information.

At step 624, in some embodiments, the vehicle path is projected onto the undistorted image using the stabilized plane parameters, and then the coordinates are distorted according to the radial distortion and rolling shutter to get path coordinates (x,y) in the image. In some embodiments, the path is projected onto the current image in two steps, due to radial distortion and rolling shutter; first, the path is projected onto the virtual, undistorted image coordinates; then, the coordinates of the path are distorted to give distorted coordinates. Alternatively, in some embodiments, reasonably accurate results can be obtained simply by projecting the vehicle path into the distorted image (especially in cases with lenses having low radial distortion).

At step 626, in some embodiments, the homography $Hd_{far}$ is used to warp the strips from image $I_{far}$ toward $I_2$, where $I_2$ is the current image and $I_{far}$ is a prior image. Note that $I_{far}$ may, in some embodiments, not be the image that immediately preceded $I_2$. In some embodiments, a minimal distance of vehicle travel (e.g., about 0.7 m) may be required between $I_{far}$ and $I_2$. For example, in a system running at 18 frames per second, if the vehicle is traveling at 45 KMH or more, then $I_{far}$ may be the previous image; f the vehicle is traveling between 22.5 KMH and 45 KMH, then $I_{far}$ may be the image before the previous image. Subpixel alignment of the rows in the two strips gives the residual motion $(d_y)$ of the points along the vehicle path relative to the stabilized road plane. In some embodiments, subpixel alignment may be performed in accordance with techniques discussed in U.S. Pat. No. 9,256,791, titled "Road Vertical Contour Detection," filed Nov. 26, 2014; and to U.S. application Ser. No. 14/798,575, titled "Road Contour Vertical Detection, filed Jul. 14, 2015.

At step 628, in some embodiments, the inverse of $Hd_{far}$ may be used to warp the point $(x,y+d_y)$ from the warped distorted image back to get the matched points in the distorted image $Id_{far}$.

At step 630, the points (x,y) and matching points are undistorted to the undistorted image coordinates. As a result of step 628, there is subpixel matching between all the point (x,y) along the path of distorted $I_2$ with corresponding points in $Id_{far}$. To get accurate numbers, these coordinates may be undistorted (for both radial distortion and rolling shutter) in both images and re-warped using the coordinates from $I_{far}$ (not the images themselves) using $H_{far}$. In some embodiments, this process may include manipulating only two vectors of image coordinates with about 200 points for each path, rather than an actual image; thus, the process may be computationally inexpensive.

At step 632, in some embodiments, the matching undistorted points are warped using $H_{far}$, and the undistorted points (x,y) are subtracted to give the true residual motion. For example, the y coordinate may be subtracted to get the undistorted $d_y$.

Figure 7A:
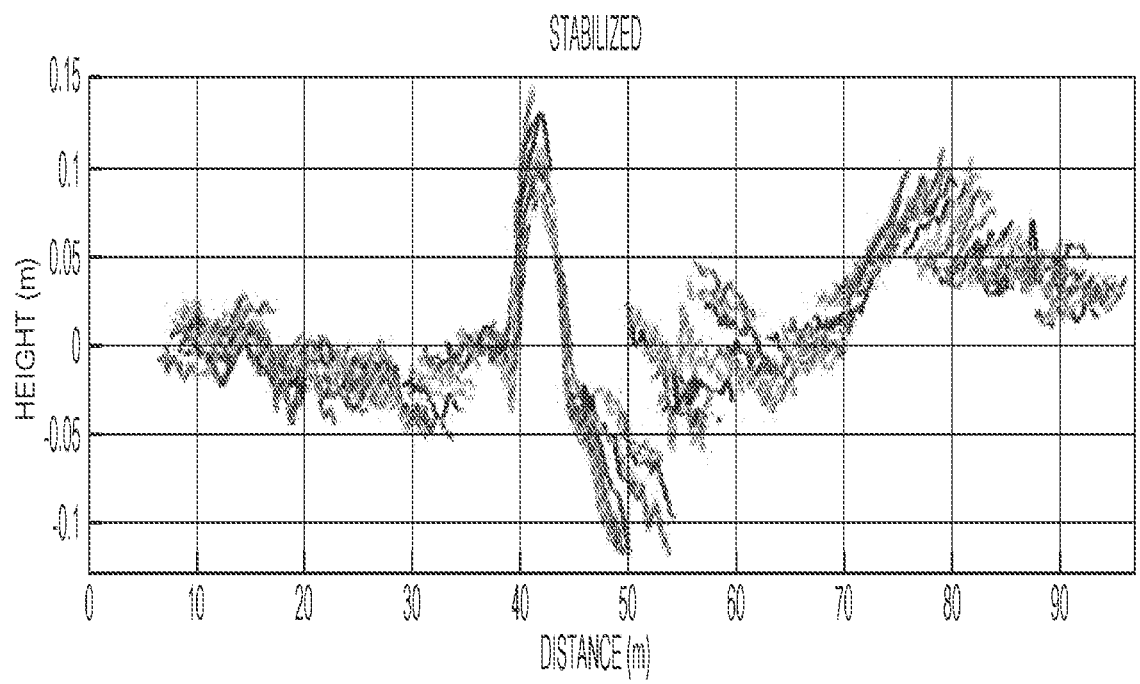
FIGS. 7A-7B illustrate stabilized road profiles in accordance with some embodiments.
Figure 7B:
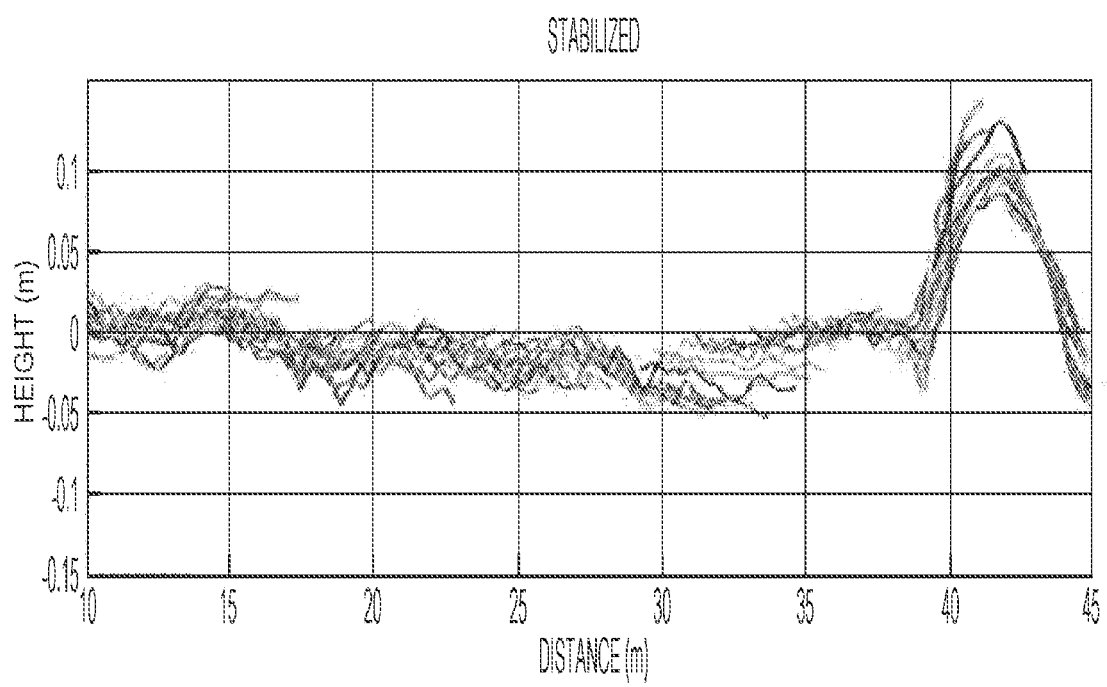

At step 634, in some embodiments, the residual motion and undistorted points (x,y) are used to compute distance and height for a profile of the single frame. In some embodiments, this computation may be performed in accordance with techniques discussed in U.S. Pat. No. 9,256,791, titled "Road Vertical Contour Detection," filed Nov. 26, 2014; and to U.S. application Ser. No. 14/798,575, titled "Road Contour Vertical Detection, filed Jul. 14, 2015. FIGS. 7A and 7B show exemplary results for a single-frame profile generated using a stabilized plane in accordance with the method explained above. FIG. 7A shows a wider portion of the profile, while FIG. 7B shows a zoom onto an area preceding a bump detected in the road. For the exemplary profiles of FIGS. 7A and 7B, alignment is performed using only forward translation along the plane. The profiles are stable during and after the bump. Note that the vertical axis is −0.15 m to 0.15 m over a forward travel of 90 m. Note that the samples' spread in height is reduced to 0.05 meters, which is significantly less than the spread in height of the profiles shown in FIGS. 4A and 4B, which were calculated without using a stabilized coordinate frame.

Multi-Frame Profile Generation in a Stabilized Coordinate Frame

In some embodiments, a plurality of consecutive image frames captured near the same point in time may all contain, as part of the image, a single common portion of the roadway. In some embodiments, it may be advantageous to correlate the image data and/or profile data taken from each respective frame, and combine it for analysis with the other image and/or profile data corresponding to the same portion of the roadway taken from the other frames. Techniques are thus provided for combining road profiles that correspond to an overlapping region of a roadway. In some embodiments, the techniques described below with respect to method 800 may serve to align various profiles that correspond to the same portion of roadway, such that slight misalignment between multiple profiles is not inaccurately interpreted as a vertical deviation (e.g., bump or dip) in the contour of a roadway. While using the same stabilized world coordinate frame to calculate and express the profiles contributes significantly to ensuring that differences between profiles do not inaccurately indicate vertical roadway contour deviations, the corrections explained below with respect to method 800 may reduce the inaccurate indications of vertical roadway contour deviations even further. In some embodiments, the techniques of method 600 and method 800 may be used separately, though they may produce results with the fewest inaccurate road contour deviations when used together.

Figure 8:
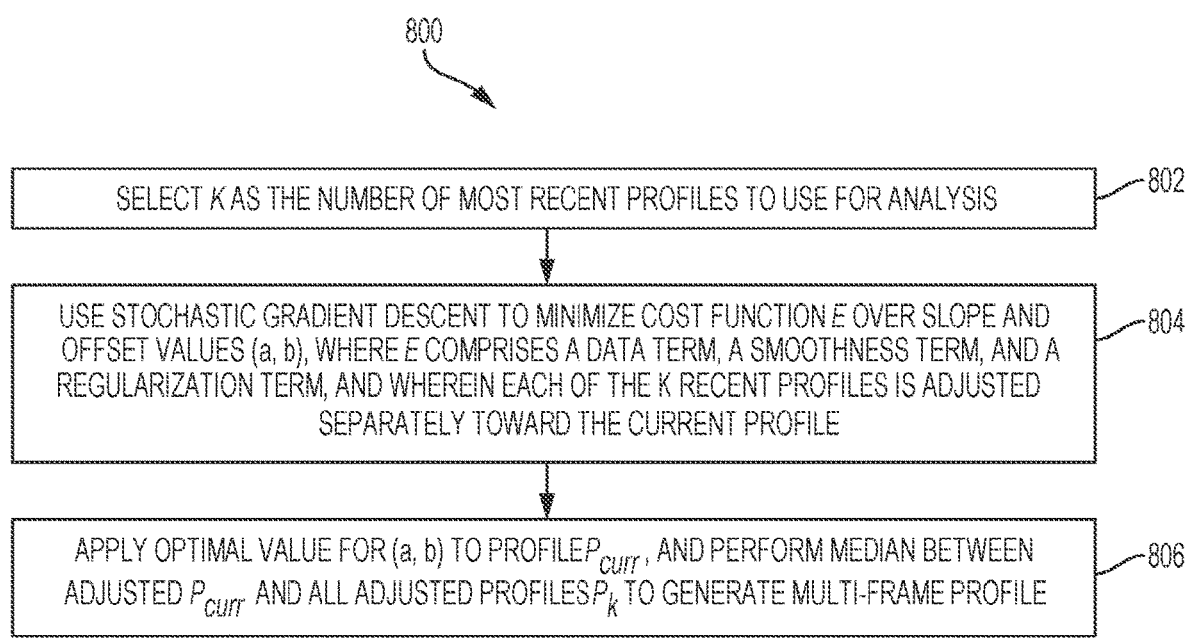
FIG. 8 shows a flow diagram illustrating a method of creating a multi-frame road profile in accordance with some embodiments.

Reference is now made to FIG. 8, which shows a flow diagram of a method of aligning multiple frames (e.g., frames representing different moments in time as a vehicle traverses a portion of road) with a global model to combine road profiles that correspond to an overlapping portion of the roadway.

Let $T_z$ be the forward motion of a vehicle along a path. In some embodiments, because $T_z$ is much smaller than the length of the profile, there may be many measurements over time for the same point along the road. Put another way, there are many consecutive frames captured by a camera in which the same portion of road is visible in the respective frame. In some embodiments, it would thus be advantageous to derive a multi-frame model that uses all measurements of the same point combined. One approach would be to take all of the single frame profiles and draw them shifted by the forward translation $T_z$. They would align reasonably well by this methodology, but there would be small vertical shifts and changes in slope. Simply averaging the heights for each point along the path may smooth out the bumps, so accounting for those shifts in height and slope is critical. It is thus desirable, in some embodiments, to align the current single frame profile $P_{curr}$ with the global model using slope and offset values (a,b). In some embodiments, that alignment may be done in accordance with the following steps.

At step 802, in some embodiments, a k may be is selected as the number of most recent profiles that will be used for an analysis. The current profile data $P_{curr}$ from 5 m to 12 m and the k adjusted previous single frame profiles that fall in the same region $P_k$ where $P_k$ have all been aligned according to the forward motion, are then selected.

At step 804, stochastic gradient descent may be used to minimize cost function E over slope and offset values (a,b), where E comprises a data term, a smoothness term, and a regularization term. In some embodiments, a data term D may be any norm not just L_1. The data term D may also be a saturated norm such as Sum(min(abs(P_curr), threshold)).

In some embodiments, a smoothness term S may also be a norm or a saturated norm. In some embodiments, a regularization term R may ascribe penalties designed to avoid large slope and offset terms, such as a term comprising a square value or an absolute value of a and b respectively. In some embodiments, E may be given by the following equations:

$$E_{a,b} = \lambda_1 D + \lambda_2 S + \lambda_3 R \qquad (7)$$

where the data term D accounting for difference from zero is given by:

$$D = \Sigma(\text{abs}(P_{curr})) \qquad (8)$$

the smoothness term accounting for the difference between the adjusted current profile and the previous adjusted single frame profiles $P_k$:

$$S = \sum_k (\text{abs}(P_{curr} - P_k)) \qquad (9)$$

and the regularization term is designed to avoid large slope and offset terms:

$$R = a^2 + b^2 \qquad (10)$$

Note that $P_{curr}$ in the above equation has been shifted in offset and slope by (a,b). Each $P_k$ is a previous single frame measurement shifted by the appropriate forward motion and adjusted by the slope and pitch calculated for that profile $(a_k, b_k)$. In some embodiments, stochastic gradient descent uses the value of E(a,b) and gradients $$\frac{\delta E}{\delta a}, \frac{\delta E}{\delta b}$$

computed for one random point along the profile to adjust the values of (a,b). In some embodiments, a fixed sequence of points may be used rather than true random points, which may avoid unpredictable random results having a disadvantageously large number of outliers, and may not be reproducible.

In some embodiments, each of the K recent profiles may be adjusted separately toward the current profile.

At step 806, in some embodiments, the optimal value for (a,b) may be applied to the profile $P_{curr}$, and a median may be calculated between adjusted $P_{curr}$ and all adjusted profiles $P_k$. For example, at each distance along the profile the system may have a measurement from $P_{curr}$ and also some number (e.g., 5) of previous measurements $P_k$. The system may calculate a median of those 6 values (in some embodiments excluding invalid values). In the described embodiment, this gives the multi-frame profile for the current frame.

Figure 9A:
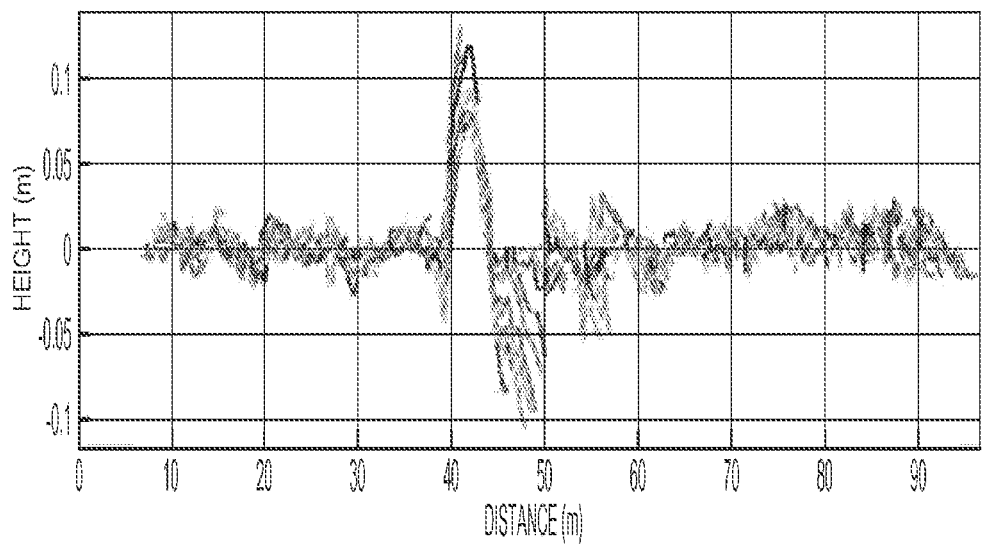
FIGS. 9A-9B illustrate stabilized road profiles with fine adjustment in accordance with some embodiments.
Figure 9B:
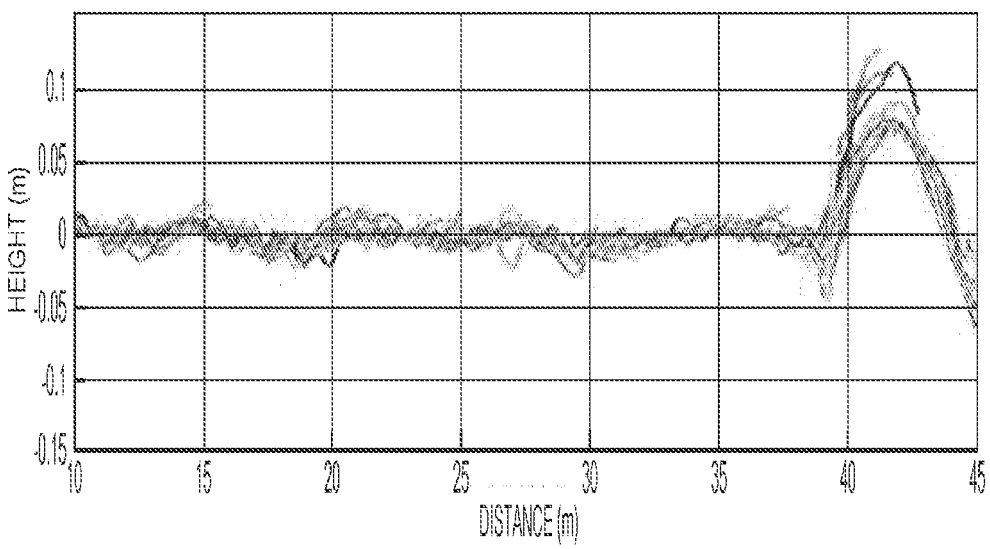
Figure 10A:
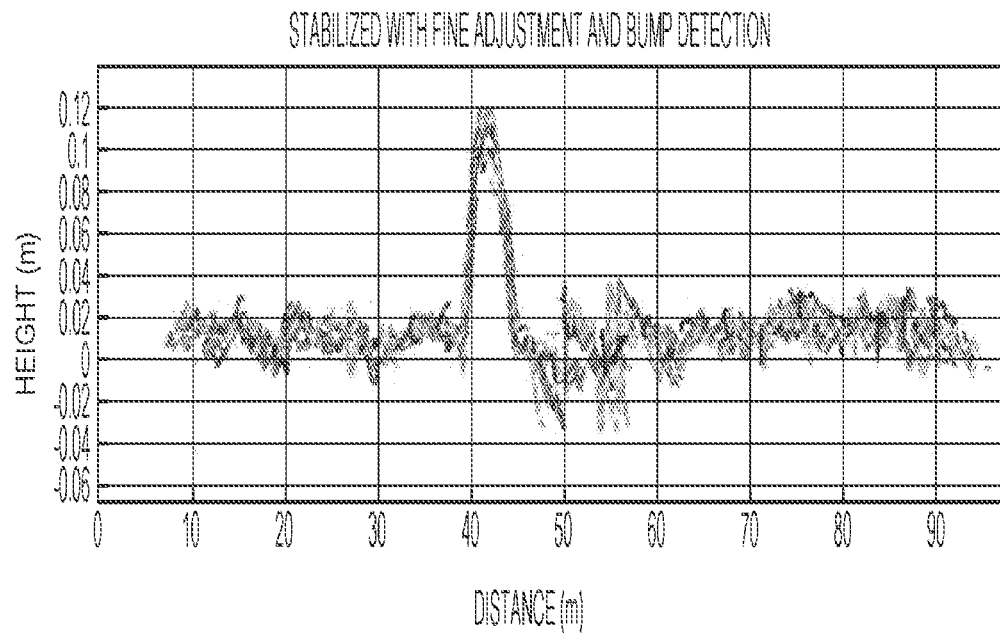
FIGS. 10A-10B illustrate stabilized road profiles with fine adjustment and with adjustment for bump detection in accordance with some embodiments.
Figure 10B:
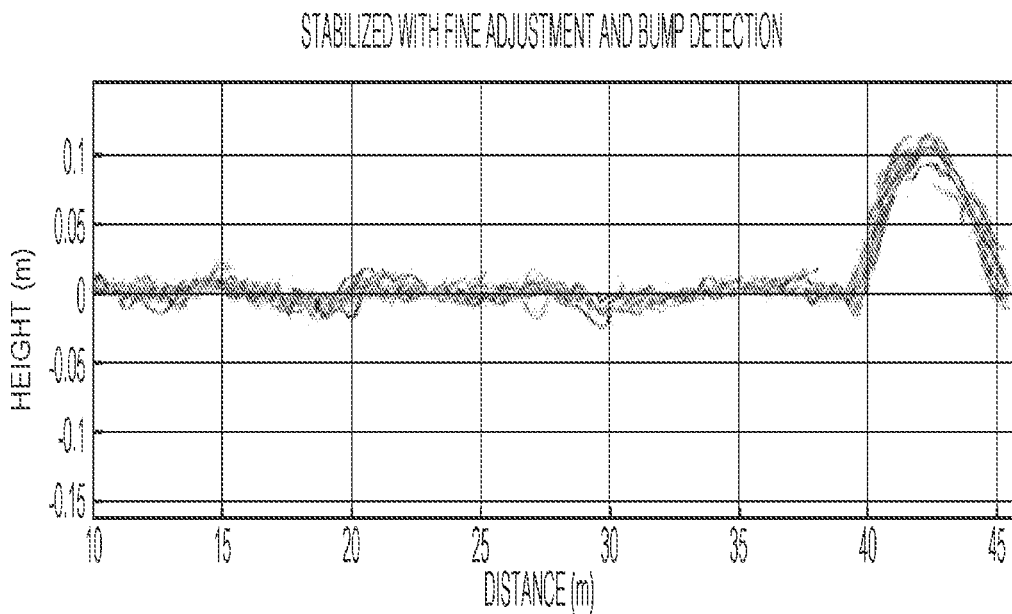
Figure 11A:
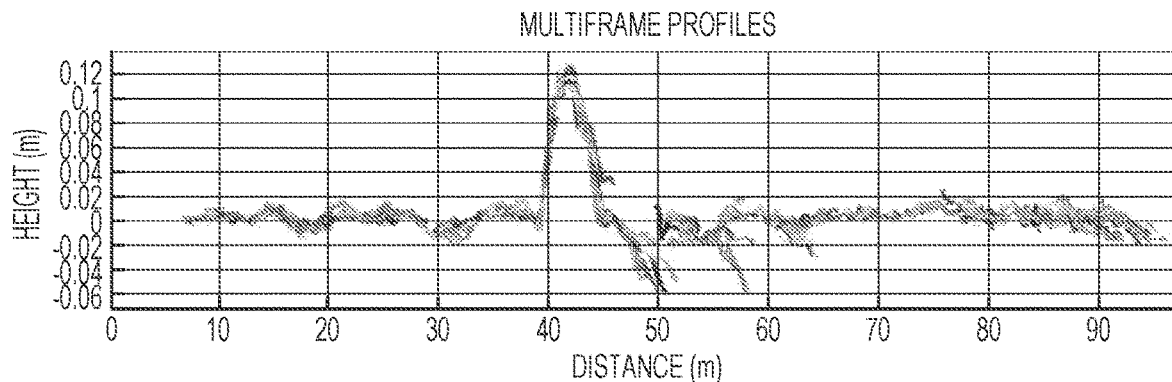
FIGS. 11A-11C illustrate multiframe road profiles in accordance with some embodiments.
Figure 11B:
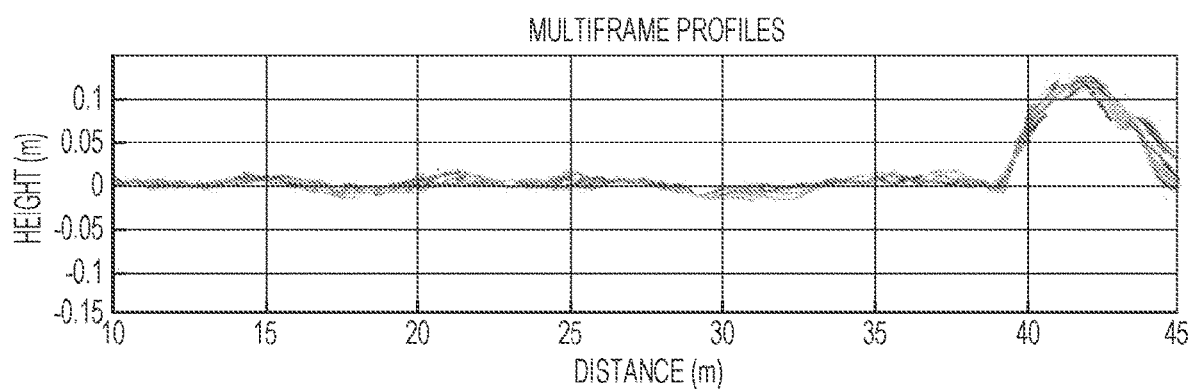
Figure 11C:
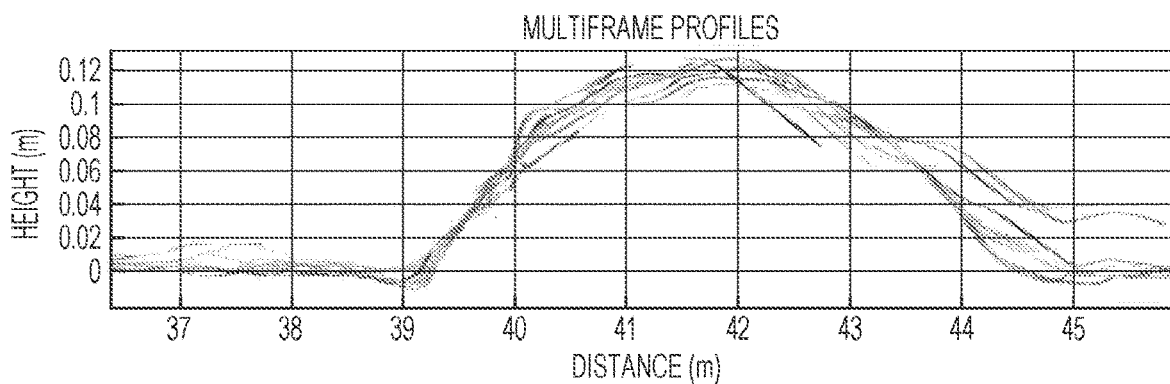

In the example shown in FIGS. 9A, 9B, 10, and 11, a median is performed between adjusted $P_{curr}$ and all adjusted profiles $P_k$ over all 140 values from 5 m to 12 m, in 0.05-meter intervals. FIG. 9 shows the single frame profiles after the fine adjustment (e.g., step 804) of the A and B values. FIG. 9A shows road profiles formed using a stabilized plane after fine alignment, while FIG. 9B shows a zoom of the same data into an area of the road preceding a speed bump. Note that the samples spread in height is tighter but the height of the bump is reduced. Compare FIGS. 7A and 7B against FIGS. 9A and 9B: in FIGS. 7A and 7B, the profiles in the flat section spread about 0.05 m; while in FIGS. 9A and 9B, the spread is about half that. However, note that in FIGS. 7A and 7B, the bump profiles are all above about 0.08 m, while in FIGS. 9A and 9B, some of the profiles are below 0.08 m. FIGS. 10A and 10B show the single frame profiles (at two different zoom levels) where A and B are computed taking into account speed bumps as explained below with reference to ignoring data terms on speed bumps. In FIGS. 10A and 10B, this issue of pushing down the speedbump as I FIGS. 9A and 9B is alleviated, while maintaining a tighter spread than in FIGS. 7A and 7B. FIGS. 11A-11C show the multi-frame profiles generated in accordance with method 800 as explained above, at various zoom levels.

1D Sampling

In some embodiments, transmitting data for a road profile for a portion of the road in front of a vehicle can require transmission of a large number of values. For example, the road profile output from 5 meters to 12 meters in front of a vehicle, sampled every 0.05 meters, requires 140 values; the number of required values is obviously even greater for a longer profile. The large numbers of values that may be required can be problematic for the controller area network (CAN), and may require significant computational resources on the receiving end. For example, in some embodiments, 200 data points may be transmitted per wheel per frame, which may require over 1 KB of data to be transmitted per frame. In some embodiments, transmitting this amount of data for every frame may be unfeasible and/or too computationally expensive for the receiving system.

Furthermore, some DAS and self-driving systems require the receipt of data at a predefined frame rate, such as 100 Hz, such that the system calls for one data point corresponding to a height of the road (at a predetermined distance in front of the vehicle) every 10 milliseconds. In some embodiments, sending data to a system every 10 milliseconds may be unfeasible because it may monopolize data channels in a vehicle, such that other information is unable to be sent over the same data channels.

Accordingly, there is a need for systems and methods for transmitting computationally efficient amounts of data regarding road profiles in such a manner that (a) the total amount of data sent is computationally manageable and (b) the data transmission does not monopolize data channels at all points in time.

In some embodiments, a data format for sending information about road profiles is provided in which the road height is output at a particular distance in front of a wheel. In some embodiments, the distance is a fixed distance (e.g., 7 meters), and in some other embodiments the distance may be dynamically determined. For example, the distance in front of the wheel may be dynamically determined in accordance with a speed of the vehicle, increasing the reference distance at higher speeds. In some embodiments, the distance may be set in accordance with the distance covered by the vehicle in a given amount of time (e.g., the distance covered by the vehicle at its current speed in 0.5 seconds). Rather than conveying an entire profile, or profile data relating to the road height along the entire known wheel path at each time step, merely sending data corresponding to a certain fixed distance in front of the wheel allows for less total data to be transmitted, which may conserve computational resources and bandwidth.

In some embodiments, a data format is further provided in which, instead of just one point of data, multiple data points are transmitted substantially simultaneously, to effectively multiply the frame rate. For example, if the frame rate is 10 Hz, a system may in some embodiments simulate the output of data at 100 Hz by sending 10 data points at once, in a burst, at a true frequency of 10 Hz. After transmission, the receiving component may unpack the 10 data points and consult them one at a time, as successively required. In some embodiments, all data points corresponding to a single frame may be transmitted in a single data transmission, while in some embodiments they may be transmitted in multiple transmissions which number fewer than the number of data points per frame (e.g., 7 data points per frame sent in just two CAN messages). In some embodiments, fewer than 10 data points may be sent per burst. In some embodiments, 16 data points may be sent per burst.

Figure 12:
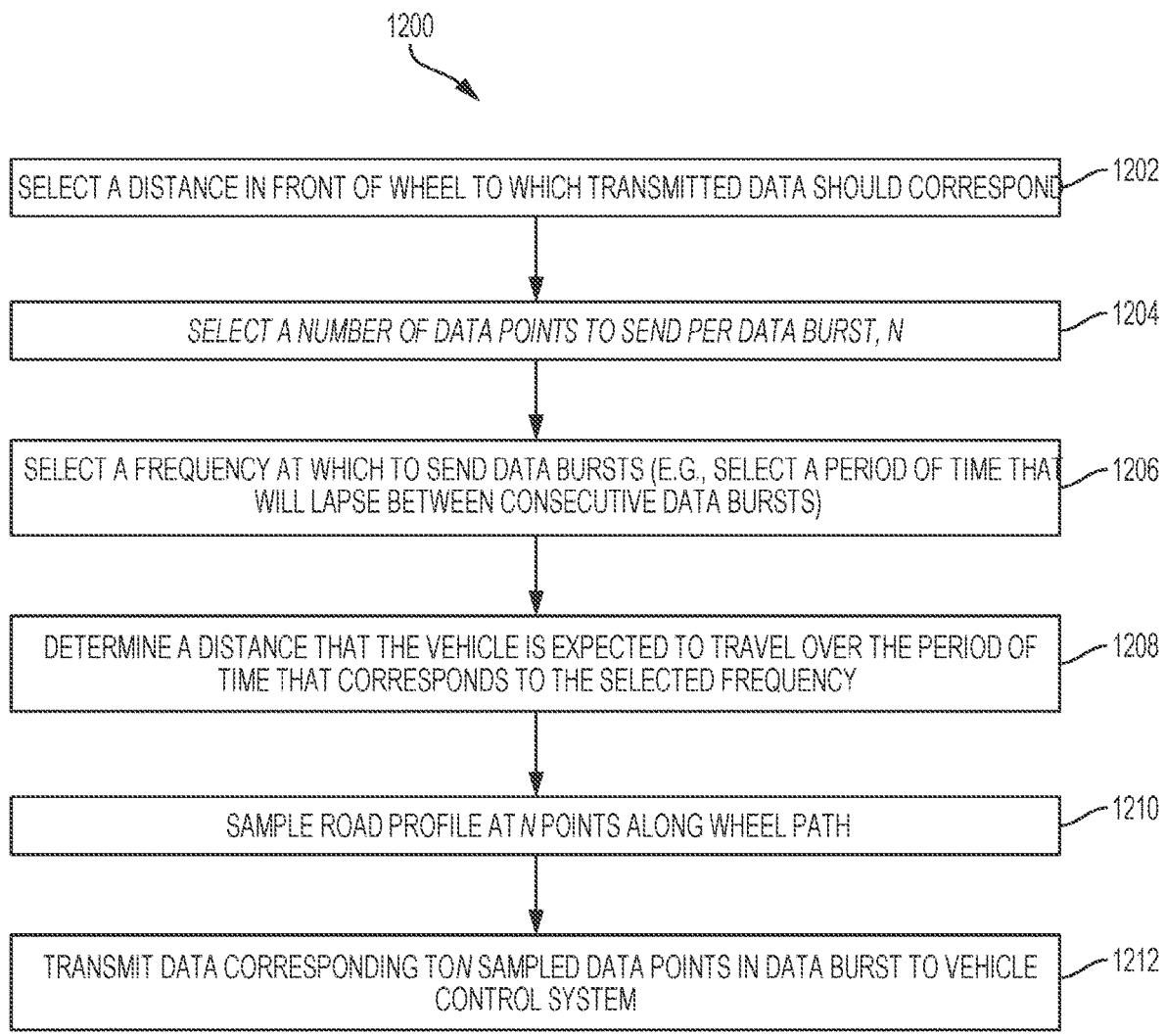
FIG. 12 shows a flow diagram illustrating a method of generating data in accordance with 1D sampling in accordance with some embodiments.

Attention is now directed to FIG. 12, which is a flow diagram showing an exemplary method 1200 of generating data in accordance with the ID sampling techniques discussed above.

In some embodiments, at step 1202, a system may select a distance in front of a wheel of the vehicle to which transmitted data should correspond. The distance in front of the wheel may be predetermined by the vehicle control system to which the data will be transmitted. In some embodiments, selecting the distance in front of the wheel may include accounting for system latency, such that a system will receive data at a time when the respective data corresponds to a target distance in front of the wheel. For example, if the target distance is 7 meters, then the system may select 71 centimeters as the distance in front of the wheel, such that system latency will cause data to be received by the system when the corresponding data point is 7 meters (rather than 71 centimeters) in front of the wheel.

In some embodiments, at step 1204, a system may select a number of data points that should be sent per burst. For example, a system may send 10 data points per burst, as discussed above. In some embodiments, a system may send multiple data transmissions per burst, such as two CAN messages per frame. In some embodiments in which multiple transmissions are sent per burst, the system may select a number of data points (which may be the same or different) to be sent per each transmission in the data burst.

In some embodiments, at step 1206, a system may select a frequency at which to send data bursts. For example, a system may send one burst of data (e.g., 10 data points) every 100 milliseconds. The frequency at which data bursts are sent may be determined by the bandwidth of data channels in the vehicle, or may otherwise be predetermined by the receiving vehicle control system.

In some embodiments, at step 1208, a system may determine a distance that the host vehicle is anticipated to travel in the time that corresponds to the frequency at which data will be sent. For example, a system may determine the distance that the host vehicle is anticipated to travel in 100 milliseconds. In some embodiments, the distance that the vehicle is expected to travel may be determined by sampling (from prior image data and/or from other sensors and systems in the vehicle) the vehicle's current velocity and/or acceleration.

In some embodiments, at step 1210, a system may sample a road profile at n points along the projected path of a wheel, where n is the number of data points per burst. In some embodiments, the points at which the road profile is sampled may be spaced between (e.g., may span from, or may be spaced evenly between) the selected distance in front of the wheel and that distance plus the estimated distance the vehicle will travel before the next data burst is sent. In some embodiments, a road profile may be sampled at points along a path segment that extends beyond the selected distance in front of the wheel plus the estimated distance the vehicle will travel before the next data burst is sent; in this way, there may be some overlap between the portions of the road corresponding to data bursts from different frames, creating redundancy which in some embodiments may improve accuracy of vertical deviation calculations. In some embodiments, one or more of the data points may be associated with a respective confidence value; further techniques regarding confidence values are discussed herein below.

In some embodiments, data points may be generated in accordance with a stabilized reference plane. In some embodiments, data points may be generated at least in part by combining profile information from multiple frames.

In some embodiments, a vehicle control system may receive all of the data points substantially simultaneously in a single data burst, and may unpack the data points to read them individually as required over the time period before the next data burst arrives. For example, a system may receive a data burst containing 10 data samples, and may unpack the burst and read one sample every 10 milliseconds until a second data burst (having 10 additional data points) is received 100 milliseconds later, in this way, the data bursts may simulate sending one data point every 10 milliseconds, even though data is only transmitted once every 100 milliseconds.

For example, if data points corresponding to 7 meters in front of a wheel are desired, then a system may estimate how far the vehicle will move every 10 milliseconds, and may sample a known road profile at 10 data points, starting at the point 7 meters in front of the wheel and working forward. Using Matlab™ notation:

$$Z=7+[0:0.1:0.9]*dZ/10 \qquad (11)$$

where dZ is the distance traveled between frame (100 ms). Thus, where the distance the vehicle travels in 10 milliseconds is 5 centimeters, the data points transmitted may respectively correspond to 700 centimeters, 705 centimeters, 710 centimeters, 715 centimeters, and so on through 745 centimeters. After 100 milliseconds, a second burst of 10 more data points may be sent, and at this time the vehicle will have moved forward approximately 0.5 meters. As the vehicle has shifted about 0.5 meters forward, the next 10 data points will be roughly evenly spaced with the previous 10 data points in real-world coordinates, creating a continuous path of data points every 5 centimeters that the vehicle's driver-assist software can consult every 10 milliseconds with respect to the point currently 7 meters in front of the vehicle. In this way, by sending a burst of data points at one time, the system may simulate sending one data point at a higher frame rate while not continuously monopolizing data channels in the vehicle.

In some embodiments, if 10 data points are transmitted in accordance with the method explained above, but each group of 10 data points is sampled from a different road profile, then there may be a small discontinuity each time the data points switch from one profile to the next. To avoid this issue, a smooth transition from one profile to the next may be generated by sampling 20 data points between, for example, 7 m and 2*dZ:

$$Z=7+[0:0.1:1.9]*dZ/10 \qquad (12)$$

and then averaging the current first 10 measurements with the previous second 10 measurements, gradually increasing the weight of the current measurement and reducing the weight of the previous frame measurements. For example:

$$w=[0:0.1:0.9]*10/9; \qquad (13)$$

$$P_{out}=w*P_{curr}(1:10)+(1-w)*P_{prev}(11:20) \qquad (14)$$

Figure 13A:
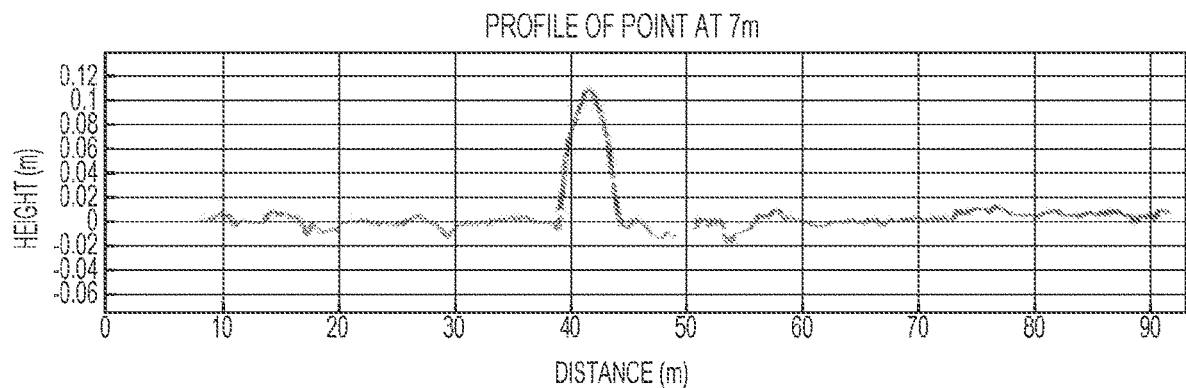
FIGS. 13A-13C illustrate results of 1D road profile sampling in accordance with some embodiments.
Figure 13B:
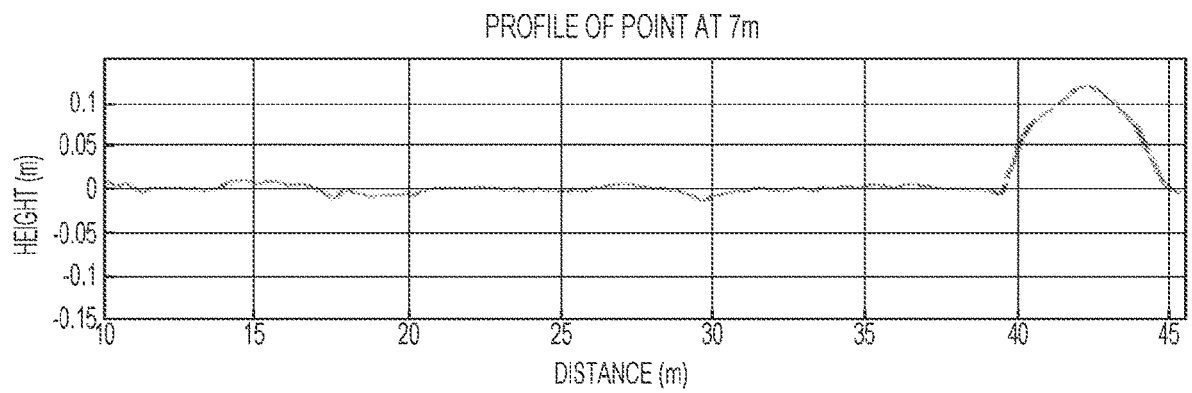
Figure 13C:
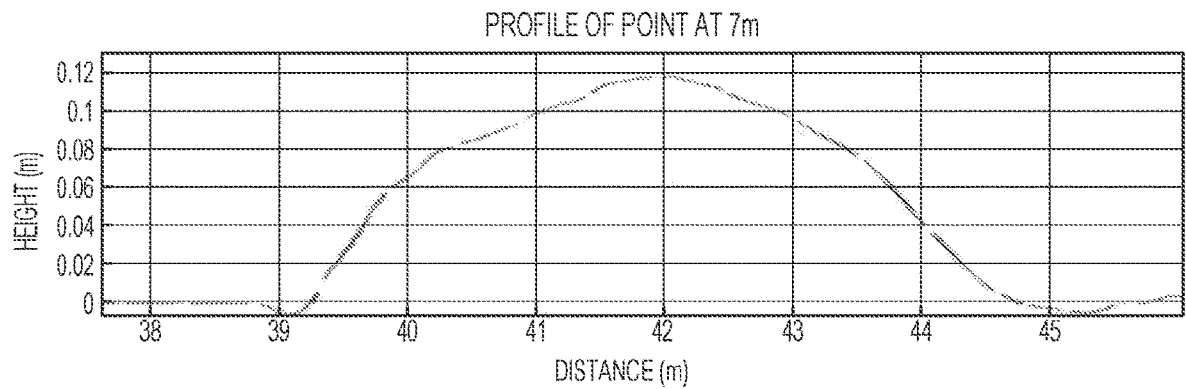
Figure 14A:
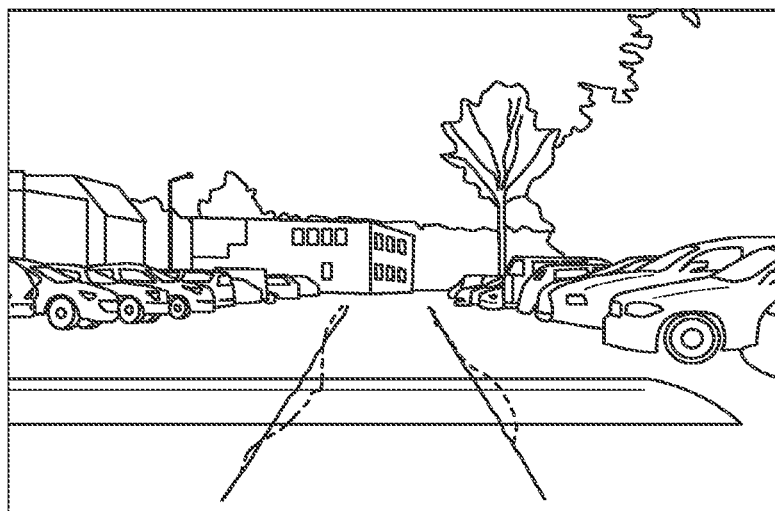
FIG. 14A illustrates predicted paths of a vehicle wheels overlaid onto a scene of a roadway in accordance with some embodiments.
Figure 14B:
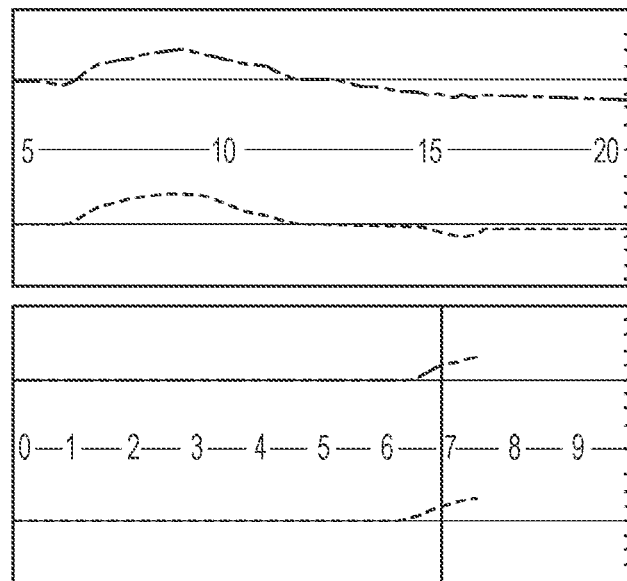
FIG. 14B illustrates predicted paths of vehicle wheels, showing predicted vertical deviation of a roadway on the y-axis of each graph.

The results of the 1D profile in accordance with the method and examples explained above are shown in FIGS. 13A-13C. FIG. 13A shows a 1D sample profile, where the 10 samples from each frame are shown as a segment. The gap at 50 meters in FIG. 8A is because on frame was not valid. FIG. 13B shows a zoom into the area preceding the detected speed bump, and FIG. 12C shows a zoom into an area centered on the speed bump itself. FIGS. 14A and 14B show an example of the system results for the example explained above with reference to 1D sampling and FIGS. 13A-13C. FIG. 14A shows the predicted path and residual motion overlaid on an image of the road, where the residual motion $d_y$ is represented graphically as deflection of the curved lines in the x direction, with deflection to the right indicating a bump; it can be seen that the calculated deflection starts at the beginning of the bump, increases toward the middle of the bump, and then decreases on the far side of the bump. In the example shown, deflection is scaled by a factor of 30 in order to make small deflections graphically visible. FIG. 14B represents the same plotted lines shown in FIG. 14A, but shown in metric coordinates in a cross-sectional view. The top two plots in FIG. 14B show the current left and right profiles from 5 meters to 20 meters, sampled every 5 centimeters from 5 meters to 10 meters, and every 10 centimeters from 10 meters to 20 meters; the y-axis is from −0.2 m to 0.2 m, and the bump detected is about 0.08 m high. The bottom two plots in FIG. 14B show the left and right 1D sample showing the accumulated profile from 7 meters in front of the vehicle up to the vehicle itself, with the vertical line indicating a point 7 meters in front of the wheel. The section to the right of the vertical line is the part computed for the current frame: from 7 m to (7+dZ) m. The part to the left of the vertical line is what was computed in previous frames. As time goes by the bump will move left and when it reaches the zero, the wheels actually touch the bump and the car reacts.

In some embodiments, spacing of data points for 1D sampling may be determined in accordance with alternative techniques. For example, in some embodiments, data points may be spaced in such a manner that the data points are separated by a distance that the vehicle is expected to travel in a fixed time. For example, a vehicle control system may be configured to process one data point every 10 milliseconds regardless of vehicle speed. In this case, a system may estimate the locations at which the vehicle is expected to be located (e.g., in accordance with the vehicle's current speed) at intervals of 10 milliseconds (e.g., estimate the respective locations at which the vehicle will be at various points in time, the points in time separated by 10 milliseconds), and may place a data point corresponding to each of those estimated locations.

In one exemplary system, bursts are outputted at 18 bursts per second (every 55 milliseconds), and data points are spaced to be sampled at a distance covered by the vehicle every 10 milliseconds. Bursts thus may include enough samples to cover the time (55 milliseconds) between bursts, for example by outputting 7 samples, which covers 60 milliseconds, so that there is some overlap of the portion of road covered by each burst.

In another exemplary system, bursts include 10 data points each, and data points are spaced apart by a distance corresponding to 5.5 milliseconds. In this system, the 10 samples cover 49.5 milliseconds, leaving 5.5 milliseconds until a second burst arrives 55 milliseconds after the first burst, with no data-point overlap.

Accounting for System Latency

In some embodiments, a DAS or automated-driving system may require data that corresponds to a point that is a certain distance (e.g., 7 meters) in front of the vehicle. In some embodiments, however, due to system latency, by the time the image data is processed and the data is received by the controller, the vehicle has moved and the data reflects a point less than the desired distance in front of the vehicle. Thus, there is a need for systems and methods that account for system latency in processing image data and transmitting road profiles and other data to a vehicle controller.

In some embodiments, if the latency $T_L$ is known, the sampling distance of the data point may be adjusted as follows:

$$Z=7+[0:0.1:1.9]*dZ/10+v*T_L \qquad (15)$$

where v is the vehicle speed.

In accordance with the adjustment for latency above, the profile may be sampled at the distances adjusted for latency to give a 1D profile at the desired distance in front of the wheel, correct for the time when the signal is received by the controller. In some embodiments, the value $T_L$ can also take into account the latency of the controller computations or of any other part of the system.

In some embodiments, the system latency may not be fixed, and thus may be unknown by the road profile estimation system. In some embodiments, if the data output includes a time stamp of the image, a vehicle controller may use the time stamp to estimate the latency from image capture to the data being received by the controller. The controller may then correct for the changes in system latency accordingly. In some embodiments, this may be facilitated if the road profile system over-samples the profile and outputs data that is more densely spaced than is required by the receiving controller or system. The controller or system may then determine the actual latency and select which of the data to use. If, instead of 10-millisecond spacing, 2-millisecond spacing is used, the controller can correct to better than 1 millisecond (e,g., having an error of less than half a millisecond). Since all of the values selected by the controller were computed by the road profile system it is simple to reproduce the results offline, for example in testing. In some embodiments, since the controller does not interpolate values and number output by the controller is a value computed by the road profile system, it may be understood where the value came from.

Ignore Data Term on Speed Bumps

Using multi-frame alignment techniques such as those described above with reference to method 600 may in some embodiments tend to "push down" the detected height of speed bumps, because the algorithm tends to seek to push the whole profile, including the road in front of a speed bump and the bump itself, down to zero. To counteract this tendency, in some embodiments, a system and method is provided that is capable of ignoring the data terms on values over a certain threshold height. The threshold height may, in some embodiments, be predetermined or dynamically determined. For example, a system may ignore the data terms on all values over 3.5 centimeters in the (a,b) optimization.

In some embodiments, a system may determine that a speed bump is likely being detected by fitting the profile to a straight line. If the profile does not fit a straight line (e.g., if the mean square error is large), then the profile is suspected to contain a speed bump.

Confidence Value

In some embodiments, it is advantageous to calculate one or more confidence values associated with a road profile and/or an image of a roadway. In some embodiments, a confidence value may be calculated that is associated with a single frame or that is associated with multiple frames. In some embodiments, a confidence value may be calculated that is associated with a respective point in an image or a respective point in a road profile.

Single-Frame Confidence

In some embodiments, a confidence value for a single frame may be calculated in accordance with the following.

Figure 3B:
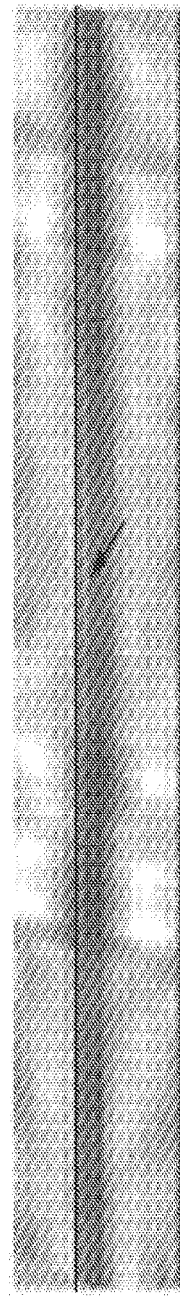
FIG. 3B illustrates a normalized correlation score along a path of a vehicle in accordance with some embodiments.
Figure 3C:
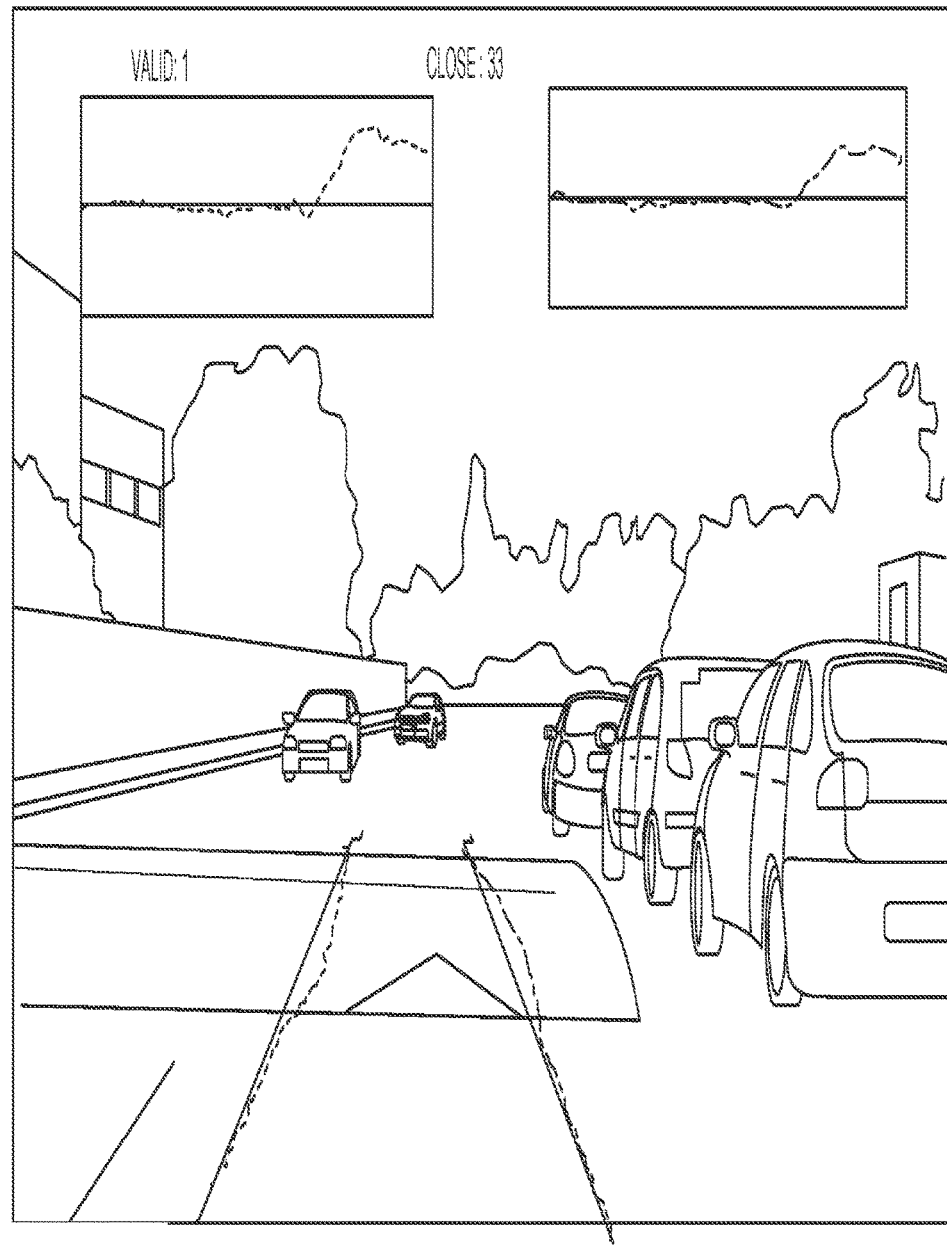
FIG. 3C illustrates a path of a vehicle projected onto an image of a roadway in accordance with some embodiments.

In some embodiments, the first step in computing the confidence is forward/backward verification using the correlation scores (such as shown in FIG. 3B). In FIG. 3B, there are 13 columns, each representing the score for a given offset (−6 to 6) for that row. In FIG. 3B darker shading represents a higher correlation score, while lighter shades represent lower correlation scores. In some embodiments, correlation scores may be represented by different colors, such as red representing a high correlation score, yellow representing a low correlation score, and green representing an even lower correlation score. The residual motion from image 2 to image 1 for a point should be equal in magnitude and opposite in sign to the residual motion from image 1 to image 2. The latter can be determined by looking at diagonal lines in the score matrix from image 2 to image 1. If the forward/backward motions do not match to within 1 pixel, then the confidence may be determined to be zero.

In some embodiments, if the forward/backward motions match, then the confidence may be determined to be the curvature of the score matrix. When the image texture is significant, a higher confidence score may thus be determined. For example, in some embodiments, a good texture may give a curvature score on the order of 0.25.

In some embodiments, region, near an end of a strip may be assigned a confidence value of zero.

in some embodiments, the confidence value determined may be used in a multi-frame analysis process, such as the process explained above with respect to method 800. Two thresholds on the confidence may be used: first, a high confidence for selecting points in the AB optimization; and second, a much lower threshold may be used to determine which points are used for the median. For example, a curvature score of above 0.1 may be used to determine which points can be used for the stochastic descent optimization (e.g., step 804), while a curvature score of 0.01 may be used to determine if the points are to be consider in the median (e.g., step 806).

Multi-Frame Confidence

A multi-frame confidence may be output from a system based on the number of height measurements and the variance of the heights used in the median computation. In some embodiments, for each point along the path, between zero and five samples are used for computing the median output depending on the single frame confidence of the point in the current frame and the previous four frames. Let N be the number of samples which were above threshold, and a multi-frame confidence may be calculated as follows:

In some embodiments, if N=0, then the multi-frame confidence may be determined to be zero. In sonic embodiments, if N=1, then the multi-frame confidence may be determined to he zero.

In some embodiments, If N≥2 then v may be computed as follows:

$$v = \frac{\sum_{i=1}^{N} |h_i - h|}{(N-1)^2} \quad (16)$$

where h is the median height and $h_i$ is the height for each sample in step 806. Note that the square $(N-1)^2$ penalizes for a small N.

In some embodiments, the confidence C is then given by:

$$C = 5*(1-S*v) \quad (17)$$

which yields a confidence value between zero and 5. The scale S may be determined empirically. In some embodiments, S may be set equal to 100. In some embodiments, confidence values for a plurality of points in an image may be indicated by the saturation of the color of the respective point in the image.

Ignoring Shadows From Moving Vehicles and Objects

In some embodiments, camera-based DAS and/or automated-driving systems may detect shadows in the captured images. For example, on bright days, it is often the case that moving vehicles or other objects, such as cyclists and pedestrians in adjacent lanes or on the sidewalk, east a moving shadow onto the road in the vicinity of the host vehicle. When such a shadow moves on the roadway, it produces residual motion and might be inaccurately interpreted as a stationary bump or dip in the surface of the roadway, and cause an undesirable controller response.

It should be noted that shadows from moving objects often have considerable residual motion, and thus may be detected as very high bumps in the roadway. For example, a shadow of an oncoming vehicle moving at the same absolute speed as the host may appear, without correction, as a bump that is half of the camera height. In some embodiments, these shadows are not tracked well and will either get low confidence or low multi-frame confidence values. In these cases, the shadows are simply ignored by the system. However, moving shadows may not always be successfully ignored based on confidence values alone. Accordingly, there is a need for systems and methods capable of distinguishing moving shadows from stationary bumps and dips in a roadway, including by actively filtering out data that is determined to correspond to a moving shadow.

In some embodiments, if a moving object is detected by other components of a DAS and/or self-driving system (e.g., camera-based vehicle detection, radar-based target detection) then this information may be used to filter out shadows by reducing confidence values associated with residual motion that corresponds to motion on the road plane at the speed of the detected object.

For example, consider a host vehicle traveling at 20 m/s and a target vehicle detected in the adjacent lane with a relative speed of −38 m/s. Simple subtraction will determine that the target vehicle is moving at −18 m/s relative to the stationary roadway. The expected motion of a point on the road moving at that speed can be estimated, for example, using the homography in equation (6) explained above with reference to step 618 of method 600 (equation number 6). In some embodiments, the homography matrix may be decomposed, the motion vector $T_{far}$ may be adjusted to take into account the target vehicle motion during the time between the two frames used to create the homography that was decomposed, and a new homography matrix may be reconstructed. The expected residual motion for a point may then be calculated as the difference between the warp according to the original $H_{far}$ and the reconstructed matrix based on the adjusted $T_{far}$. The term "warping" as used herein may refer to a transform from image space to image space. In some embodiments, the confidence value assigned to points along the path that have measured residual motion close to the suspect residual motion may then be reduced. In some embodiments, if many points along the path have residual motion close to the suspected residual motion, the entire frame can be invalidated.

Techniques for detecting shadows from moving objects are further discussed in U.S. patent application Ser. No. 14/737,522, filed Jun. 12, 2015, titled HAZARD DETECTION FROM A CAMERA IN A SCENE WITH MOVING SHADOWS. The techniques disclosed in that application may, in some embodiments, be incorporated into the techniques disclosed herein in order to more accurately calculate and output a road profile, including detecting small vertical deviations detected in a roadway surface in a similar manner, so that larger vertical deviations due to roadway hazards may be detected.

Ignoring Moving Shadows From Trees

Just as camera-based DAS and automated-driving systems may detect shadows of moving objects such as vehicles and pedestrians (as described immediately above), camera-based DAS and automated-driving systems may also detect shadows that are cast h tree branches. It is often the case that the wind blowing causes these shadows to move slowly on the surface of the road. In some embodiments, these small motions are not detected in the same way as motions attributable to large objects; instead, these small motions may appear as residual motion of small deviations in the road profile. There is, accordingly, a need for systems and methods capable of distinguishing slow-moving tree-branch shadows (and the like) from small vertical deviations in the surface of a roadway, including by actively filtering out data that is determined to correspond to a shadow of a tree.

In some embodiments, motion of shadows can be determined to be attributable to a tree branch, and can be ignored based at least in part on the following three criteria:

First, swaying branches may, in some embodiments, be detected as bouncing back and forth to create shadow motion that is not consistent over time. Thus, the resulting height profile for a point along a path affected by a swaying branch shadow may be detected as varying over time; in some embodiments, such a point may change sign, and thus be detected as a bump at one moment and then a hole at the next moment. In some embodiments, data for a given point may be collected over a certain time period, and any variance in detected height over a threshold variance may be determined to correspond to a moving shadow. For example, data may be detected over a time period such as a half-second, and any variance for a single point over a predetermined threshold in that half-second time period may be taken to indicate a moving shadow attributable to a swaying branch. Accordingly, the confidence value for that point may be reduced.

Second, motion from swaying branches, in some embodiments, may not be towards the focus of expansion. In some embodiments, this gives low confidence to tracking that enforces this constraint. In some embodiments, to verify that what appears to be a bump is not due to a moving shadow, 2D tracking may be performed, then motion that is not towards the focus of expansion may reduce the confidence. Alternately or additionally, in some embodiments, scores may be computed (e.g., as shown in FIG. 3B), but with one strip shifted laterally plus or minus a few pixels; if the scores are higher, then it indicates motion not towards the focus of expansion.

Third, in some embodiments, shadow edges from tree branches may be invariably soft. This may be due to the finite size of the sun. The shadow from a tree branch may drop off at the edge over a distance of about 1/100 of the object distance to the road surface along the path of the sunlight. Thus, an atypical texture of shadows may be detected using learning techniques such as neural networks, or an atypical texture may be explicitly detected by measuring shadow gradients. In some embodiments, detection of shadows having soft edges may cause a confidence value for the corresponding points to be reduced.

In some embodiments, machine learning such as deep neural networks (DNN) may be used to train a system on examples of patches of tree shadows, as compared to examples that are not patches of tree shadows. In some embodiments, a DNN may be fed in two strips, $I_2$ and the warped $I_{far}$, so it may use not only image texture and also motion, but also implicitly the shape of surface.

Improved Plane Detection Using Image-Based Free-Space Analysis

Various techniques are capable of analyzing a road scene to determine what portions of the image correspond to roadway and what portions of the image do not (e.g., what portions correspond to other things, such as cars, pedestrians, curbs, hedges, barriers, etc.). In some embodiments, such techniques specifically detect the presence of obstacles in the vicinity of a vehicle. For example, if another vehicle is detected, then a region of an image corresponding to the other vehicle and some area around it may be determined not to correspond to road.

In some embodiments, systems may attempt to determine whether pixels correspond to road; this may be done based on texture, color, and location in the image of the pixels, and can be performed by neural networks that are trained on examples of what parts of images do and do not represent road.

In some embodiments, the areas of an image that are determined to correspond to road surface without any obstacles may be referred to as "free space." In some embodiments of algorithms for determining vertical deviations in road surfaces and/or for determining a road profile, information as to what parts of an image correspond to free space may be used to improve the algorithm.

In some embodiments, when determining inlier points for a road model, points that lie outside the free space area may be ignored. For example, such points may simply be considered outliers, or they may also be eliminated from the number of potential inliers (thus if 13 points are outside and the remaining 20 inliers are all inliers, then the confidence can be quite high). In some embodiments, a grid of points may be redistributed in an image such that all of the points fail in the free space. In some embodiments, when computing a road profile, points along the path that are outside the free space may be given low confidence.

Although certain embodiments of the present disclosure are presented in the context of DAS applications, some embodiments may be equally applicable in other real-time signal processing applications and/or digital processing applications, such as communications, machine vision, audio and/or speech processing as examples.

The indefinite articles "a" and "an" as used herein (such as "an image") have the meaning of "one or more" (such as "one or more images").

Although selected features have been shown and described, it is to be understood that the present invention is not limited to the described features. Instead, it is to be appreciated that changes may be made to these features without departing from the principles and spirit of the invention, the scope of which is defined by the claims and the equivalents thereof.

What is claimed is:

1. A method of managing transmission of road profile information to a suspension controller of a vehicle through a data interface, the method comprising:
   obtaining a first distance in front of a wheel of the vehicle;
   obtaining a frequency at which data is transmitted via the data interface;
   estimating a second distance traveled by the vehicle in a time period equal to an inverse of the frequency;
   sampling, based on at least the frequency and the second distance, a predetermined number of data points from a road profile along a projected path of the vehicle, wherein the data points are sampled along a segment of the path defined by the second distance beyond the first distance; and
   transmitting road profile information corresponding to the predetermined number of data points via the data interface.

2. The method of claim 1, wherein the first distance is adjusted to consider computing time or transmission delay, along with a vehicle speed.

3. The method of claim 2, wherein the first distance is set to be a set distance from the vehicle when the data is received by the suspension controller.

4. The method of claim 2, wherein the first distance is derived from a set time the vehicle will traverse to the first point from when the data is received by the suspension controller.

5. The method of claim 2, further comprising estimating a delay from a time of capture in a road profile computation model module to a time of receipt at a transmission module.

6. The method of claim 5, wherein the road profile computation model module sends an over-sampled set of data points from the road profile and the transmission module estimates the delay and transmits a subset of points or a re-sampled set of points from the road profile.

7. The method of claim 1, wherein a driver assistance system comprises a camera operatively connectible to a processor and the data interface.

8. The method of claim 1, further comprising controlling an adaptive suspension system using the road profile information.

9. A driver assistance system mounted in a vehicle, the system comprising:
   a processor,
   a camera operatively connectible to the processor and a data interface, and
   a memory storing instructions that, when executed by the processor, cause the system to:
   obtain a first distance in front of a wheel of the vehicle;
   obtain a frequency at which data is transmitted via the data interface;
   estimate a second distance traveled by the vehicle in a time period equal to an inverse of the selected frequency;
   sample, based on at least the frequency and the estimated second distance, a predetermined number of data points from a road profile along a projected path of the vehicle, wherein the data points are sampled along a segment of the path defined by the estimated second distance beyond the selected first distance; and
   transmit road profile information corresponding to the predetermined number of data points via the data interface.

10. The system of claim 9, wherein the first distance is adjusted to consider computing time or transmission delay, along with a vehicle speed.

11. The system of claim 10, wherein the first distance is set to be a set distance from the vehicle when the data is received by a suspension controller.

12. The system of claim 10, wherein the first distance is derived from a set time the vehicle will traverse to the first point from when the data is received by the suspension controller.

13. The system of claim 10, further comprising a transmission module to estimate a delay from a time of capture in a road profile computation model module to a time of receipt at the transmission module.

14. The system of claim 13, wherein the road profile computation model module sends an over-sampled set of data points from the road profile and the transmission module estimates the delay and transmits a subset of points or a re-sampled set of points from the road profile.

15. The system of claim 9, further comprising an adaptive suspension system, and wherein the memory is configured to transmit the road profile information for use in controlling the adaptive suspension system.

16. A non-transitory computer readable storage medium storing instructions, which when executed by a processor with a data interface, cause the processor to:
   obtain a first distance in front of a wheel of the vehicle;
   obtain a frequency at which data is transmitted via the data interface;
   estimate a second distance traveled by the vehicle in a time period equal to an inverse of the selected frequency;
   sample, based on at least the frequency and the estimated second distance, a predetermined number of data points from a road profile along a projected path of the vehicle, wherein the data points are sampled along a segment of the path defined by the estimated second distance beyond the selected first distance; and
   transmit road profile information corresponding to the predetermined number of data points via a data interface to a suspension controller.

17. The non-transitory computer readable storage medium of claim 16, wherein the first distance is adjusted to consider computing time or transmission delay, along with a vehicle speed.

18. The non-transitory computer readable storage medium of claim 17, wherein the first distance is set to be a set distance from the vehicle when the data is received by the suspension controller.

19. The non-transitory computer readable storage medium of claim 17, wherein the first distance is derived from a set time the vehicle will traverse to the first point from when the data is received by the suspension controller.

20. The non-transitory computer readable storage medium of claim 17, further comprising instructions to estimate a delay from a time of capture in a road profile computation model module to a time of receipt at a transmission module.

21. The non-transitory computer readable storage medium of claim 20, wherein the road profile computation model module sends an over-sampled set of data points from the road profile and the transmission module estimates the delay and transmits a subset of points or a re-sampled set of points from the road profile.

22. The non-transitory computer readable storage medium of claim 16, further comprising instructions to transmit the road profile information for use in controlling an adaptive suspension system.

* * * * *

UNITED STATES PATENT AND TRADEMARK OFFICE
CERTIFICATE OF CORRECTION

PATENT NO. : 10,984,259 B2  
APPLICATION NO. : 16/658360  
DATED : April 20, 2021  
INVENTOR(S) : Stein et al.

It is certified that error appears in the above-identified patent and that said Letters Patent is hereby corrected as shown below:

On the Title Page

In "Related U.S. Application Data", in Column 1, Line 1, delete "(60)" and insert --(63)-- therefor In the Claims In Column 25, Line 43, in Claim 9, delete "Adriver" and insert --A driver-- therefor Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*